US009172581B2

(12) United States Patent
Kimura et al.

(10) Patent No.: US 9,172,581 B2
(45) Date of Patent: Oct. 27, 2015

(54) COMMUNICATION SYSTEM, DATACENTER APPARATUS, AND CONTROL METHOD USED IN DATACENTER APPARATUS

(71) Applicant: Kabushiki Kaisha Toshiba, Tokyo (JP)

(72) Inventors: Shingo Kimura, Hachioji (JP); Toshio Nishida, Hino (JP); Takeshi Watakabe, Ome (JP); Yoshihiro Kawauchi, Hino (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 133 days.

(21) Appl. No.: 13/969,093

(22) Filed: Aug. 16, 2013

(65) Prior Publication Data

US 2013/0336312 A1    Dec. 19, 2013

Related U.S. Application Data

(63) Continuation of application No. PCT/JP2013/059788, filed on Mar. 25, 2013.

(30) Foreign Application Priority Data

Apr. 27, 2012  (JP) ................................ 2012-104085
Nov. 12, 2012  (JP) ................................ 2012-248331

(51) Int. Cl.
| | | |
|---|---|---|
| *H04L 1/00* | (2006.01) | |
| *H04L 29/06* | (2006.01) | |
| *H04M 3/42* | (2006.01) | |
| *H04M 3/56* | (2006.01) | |

(52) U.S. Cl.
CPC ..... *H04L 29/06176* (2013.01); *H04M 3/42136* (2013.01); *H04M 3/567* (2013.01)

(58) Field of Classification Search
CPC .................. H04Q 3/0029; H04Q 3/66; H04Q 2213/13103; H04Q 2213/13141; H04Q 2213/13097; H04L 65/00; H04L 45/00; H04L 45/02; H04L 45/04; H04L 2012/64; H04L 12/64; H04L 29/06176; H04L 47/10; H04L 47/30
USPC ............. 379/220.01, 221.01, 221.02, 221.03, 379/221.06, 265.02; 370/352, 351, 355, 370/356, 229, 230, 235
See application file for complete search history.

(56) References Cited

U.S. PATENT DOCUMENTS 8,477,926 B2    7/2013  Jasper et al.
2006/0265376 A1  11/2006  Tagane et al.
(Continued)

FOREIGN PATENT DOCUMENTS

| JP | 2006-325038 | 11/2006 |
|---|---|---|
| JP | 2009-259206 | 11/2009 |

(Continued)

OTHER PUBLICATIONS

International Search Report and Written Opinion from PCT/JP2013/059788 application dated Apr. 23, 2013.

(Continued)

*Primary Examiner* — Dady Chery
(74) *Attorney, Agent, or Firm* — Blakely Sokoloff Taylor & Zafman LLP

(57) ABSTRACT

According to one embodiment, a communication system includes at least one user apparatus and a datacenter apparatus. The datacenter apparatus includes a processor, a memory and a controller. The processor includes a plurality of containers required to execute a plurality of communication functions associated with the exchange processing between the communication terminals or between the communication terminal and the communication line. The memory stores a user ID used to identify the user apparatus. The controller provides a communication service using at least one of the plurality of containers when a use request of the communication function is received from the user apparatus.

39 Claims, 14 Drawing Sheets

(56) References Cited

U.S. PATENT DOCUMENTS

| | | | |
|---|---|---|---|
| 2010/0232594 A1* | 9/2010 | Lawson et al. | 379/220.01 |
| 2011/0239215 A1 | 9/2011 | Sugai | |
| 2011/0255675 A1* | 10/2011 | Jasper et al. | 379/112.1 |
| 2011/0280390 A1 | 11/2011 | Lawson et al. | |
| 2013/0251129 A1 | 9/2013 | Jasper et al. | |

FOREIGN PATENT DOCUMENTS

| | | |
|---|---|---|
| JP | 2011035606 | 2/2011 |
| JP | 2011-150480 | 8/2011 |
| JP | 2011198332 | 10/2011 |
| JP | 2012-519454 | 8/2012 |
| WO | 2010-101935 A1 | 9/2010 |
| WO | WO 2011130179 | 10/2011 |

OTHER PUBLICATIONS

Japanese Patent Application No. 2012-248331, First Office Action, mailed Jul. 8, 2014, (with English Translation).

* cited by examiner

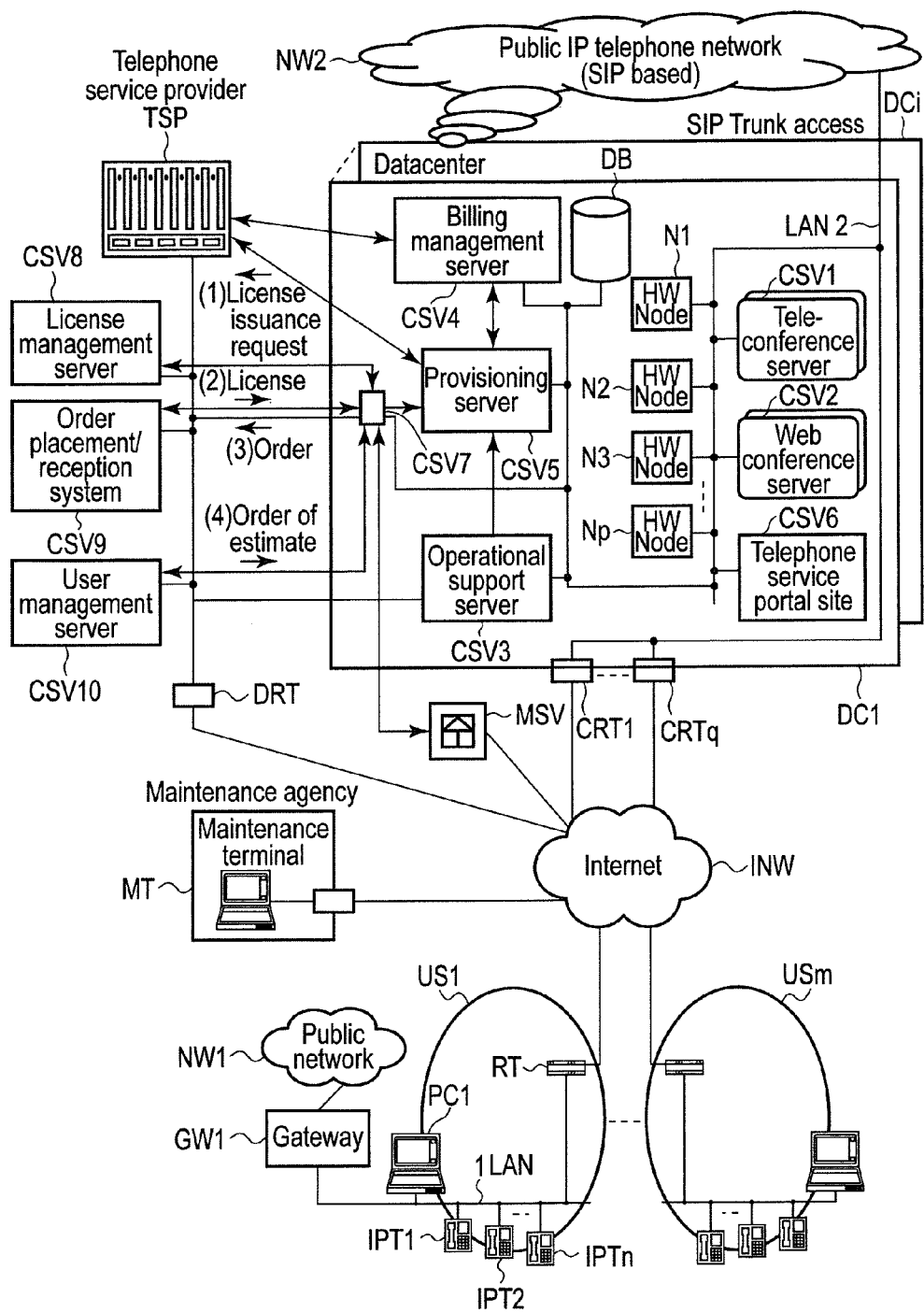
F I G. 1

| User ID | IP address | Setting resource | Device identification number | Password | Login | IPT terminal serial number |
|---|---|---|---|---|---|---|
| US1 | ▫▫▫▫ | Call control function, voice mail function teleconference function, web conference function | 123...9 | ABCDE | IPT1 IPT2 | 123456 AB12CD |
| US2 | ○○○○ | Call control function, voice mail function | 32...8 | XYZCAB | | |
| -------- | | -------- | -------- | -------- | -------- | -------- |
| USm | ×××× | Call control function, emergency call control function | 3372...1 | DFB...X | | |

F I G. 3

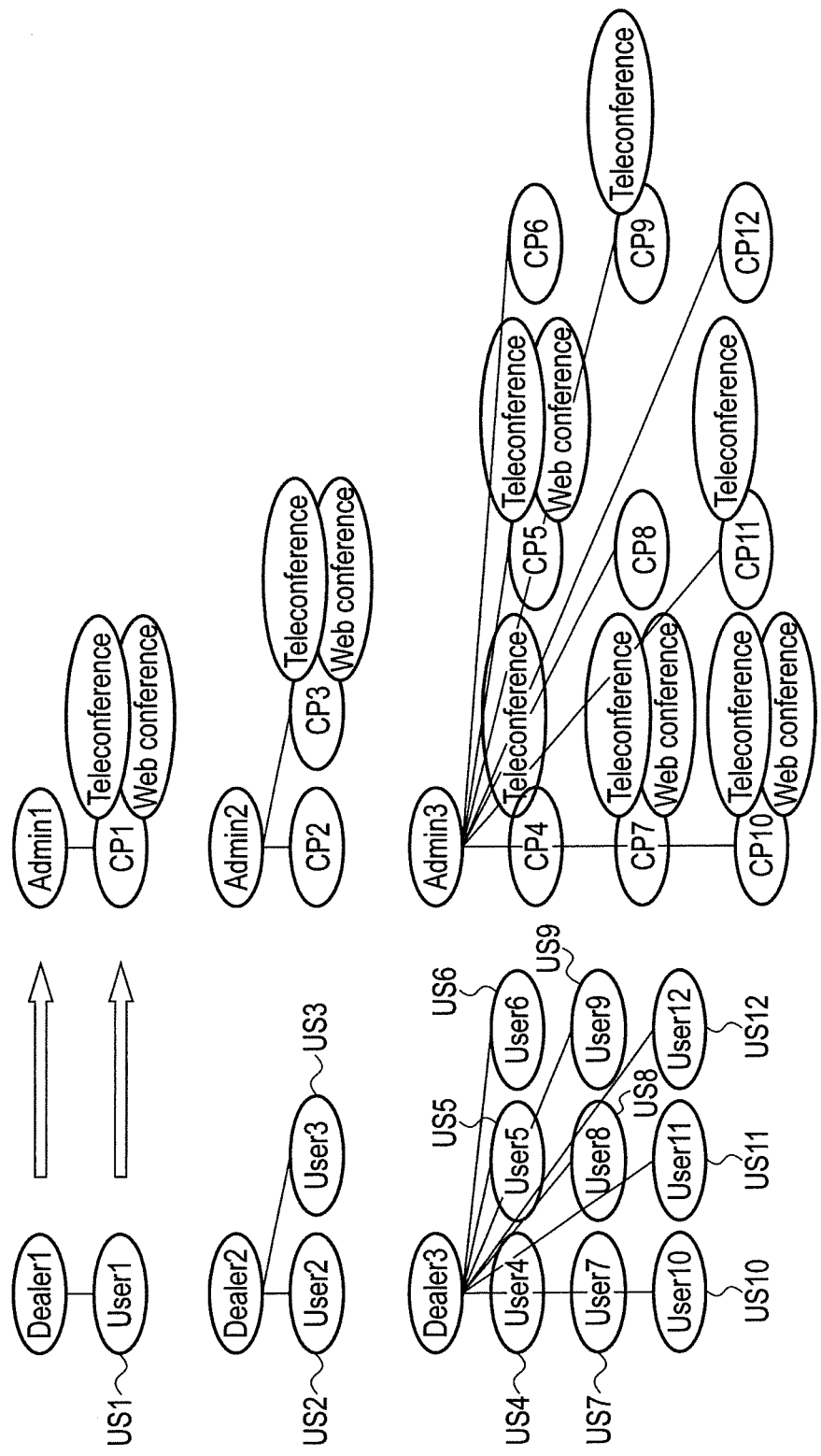
F I G. 4

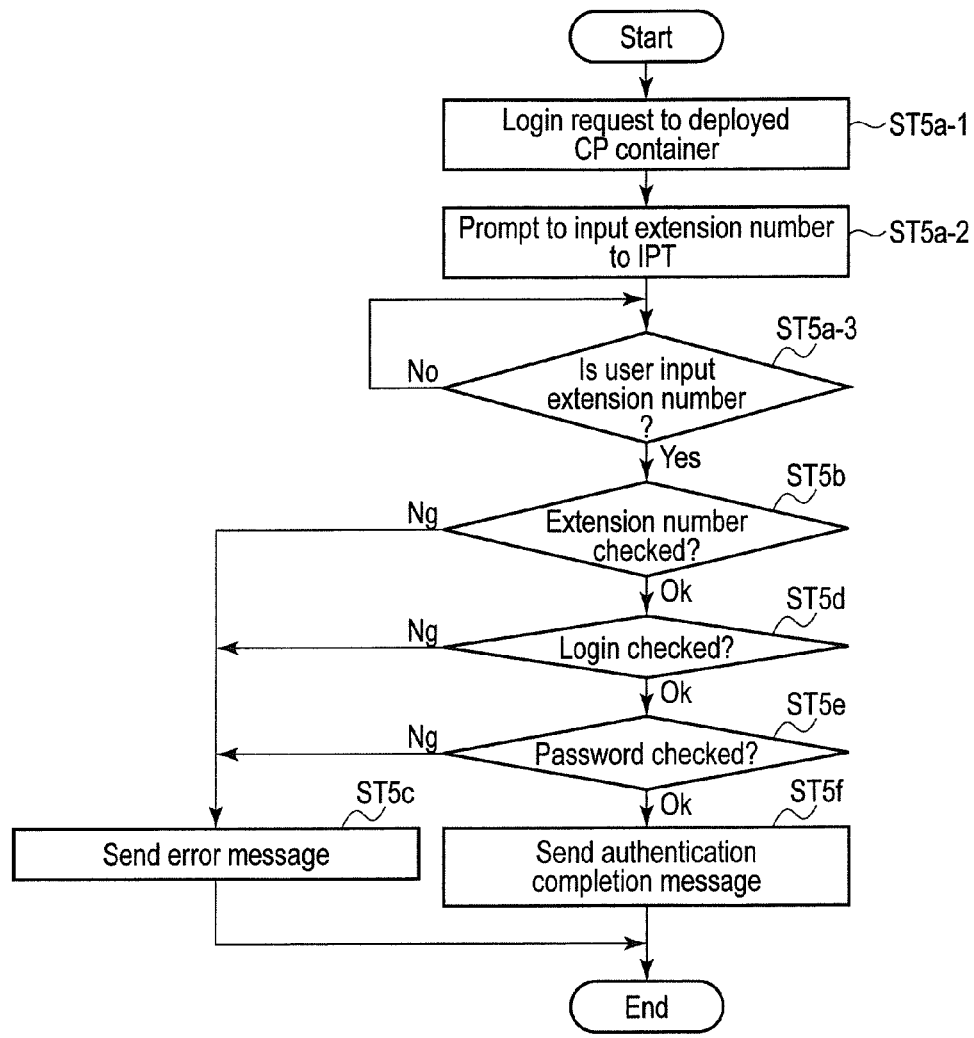
F I G. 5
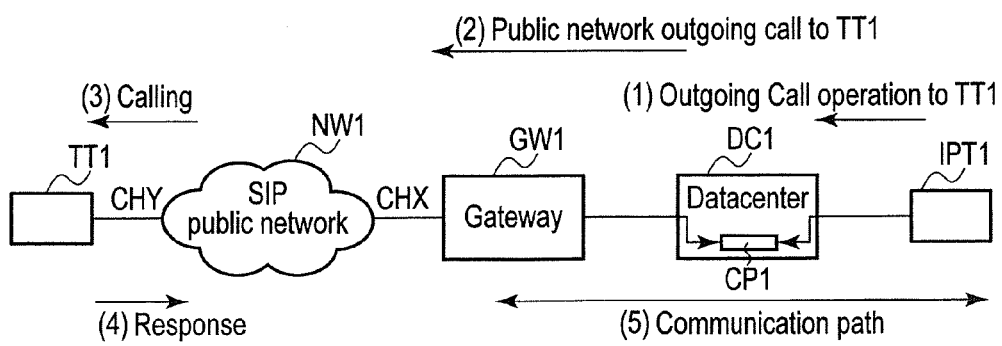
F I G. 6

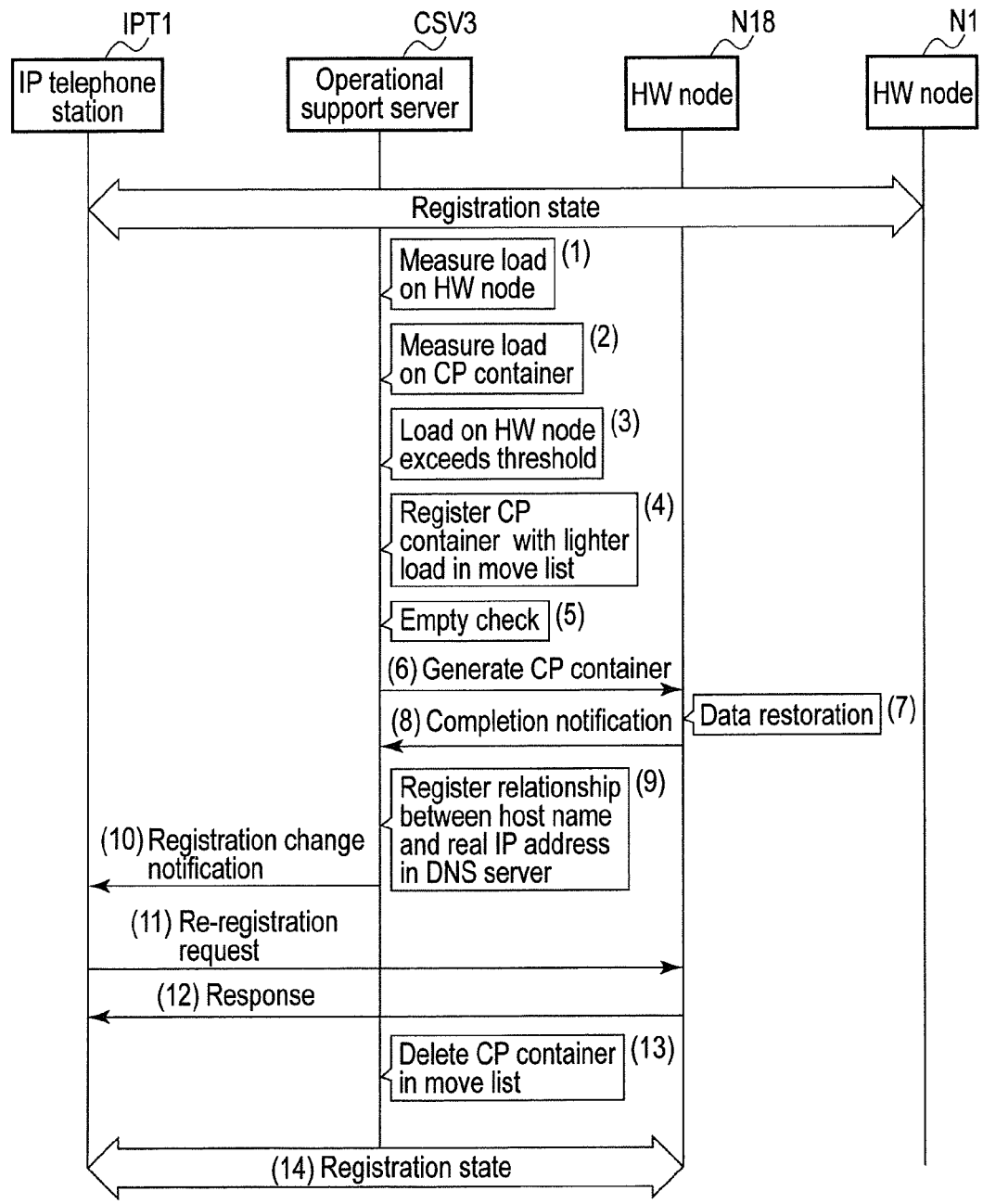
F I G. 7

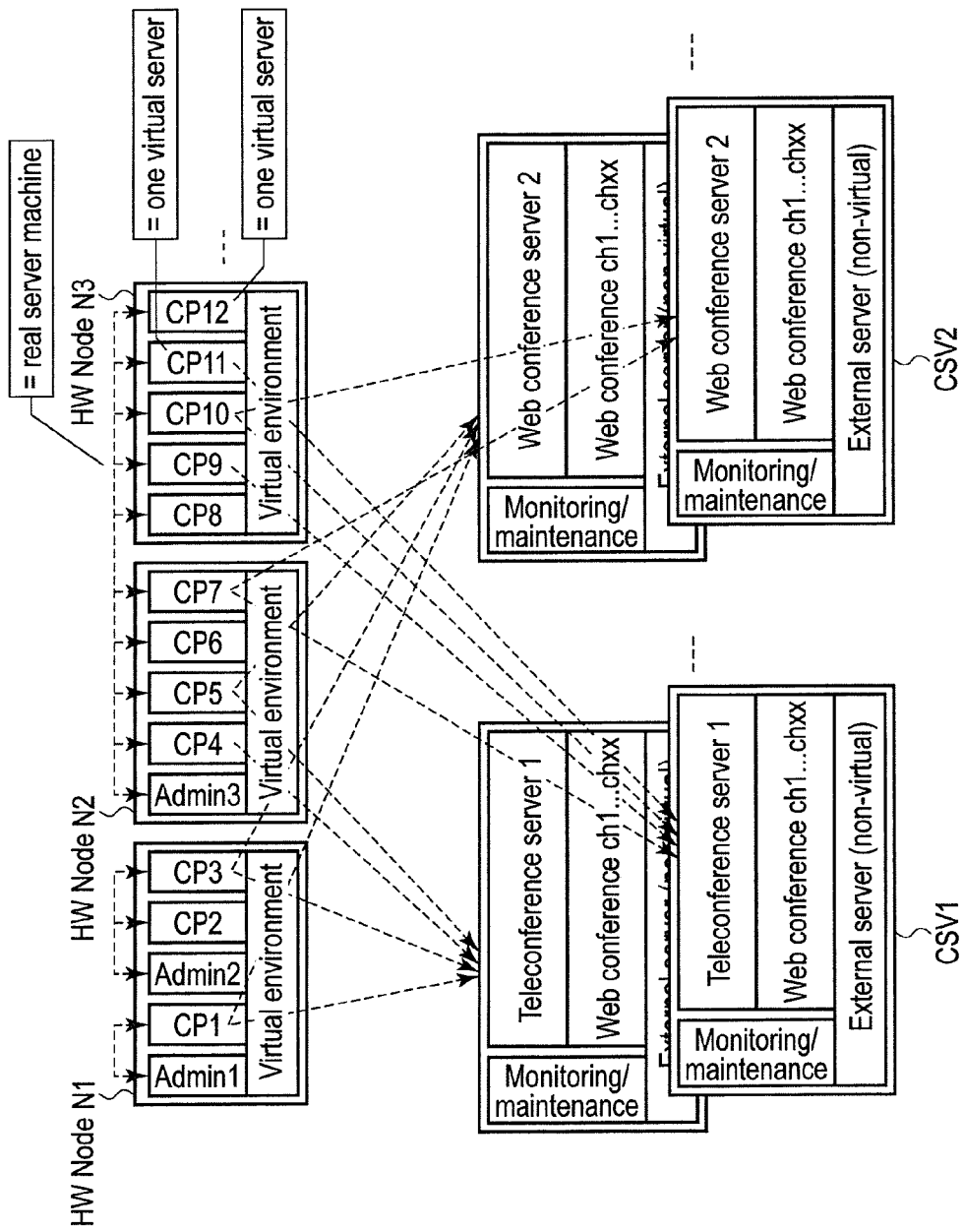
F I G. 9

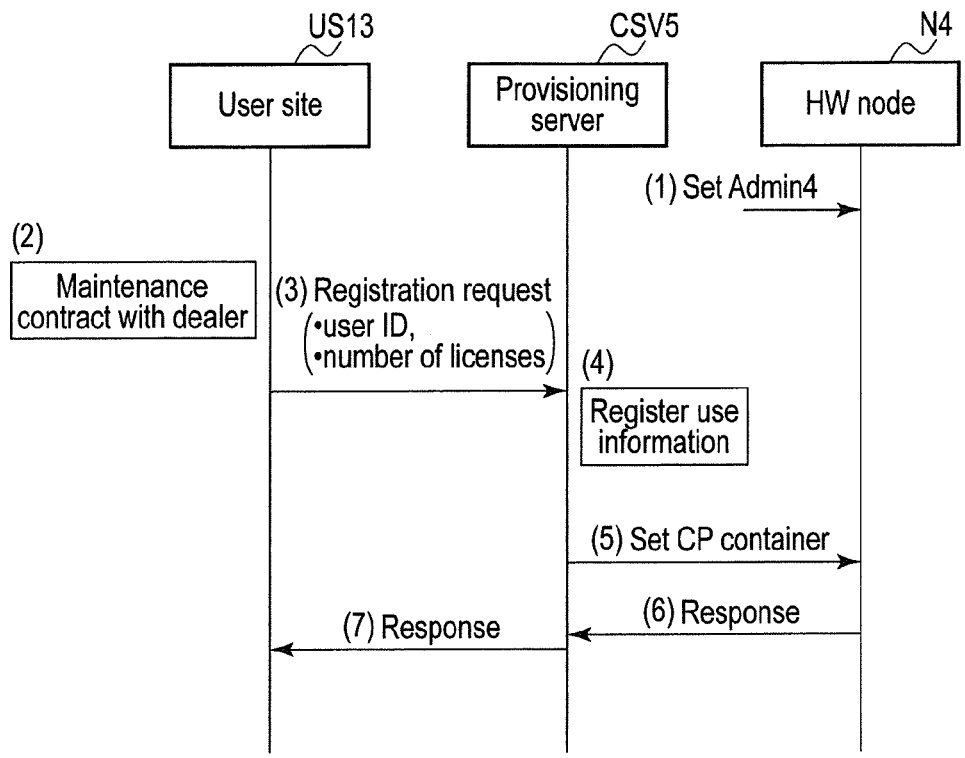
F I G. 10
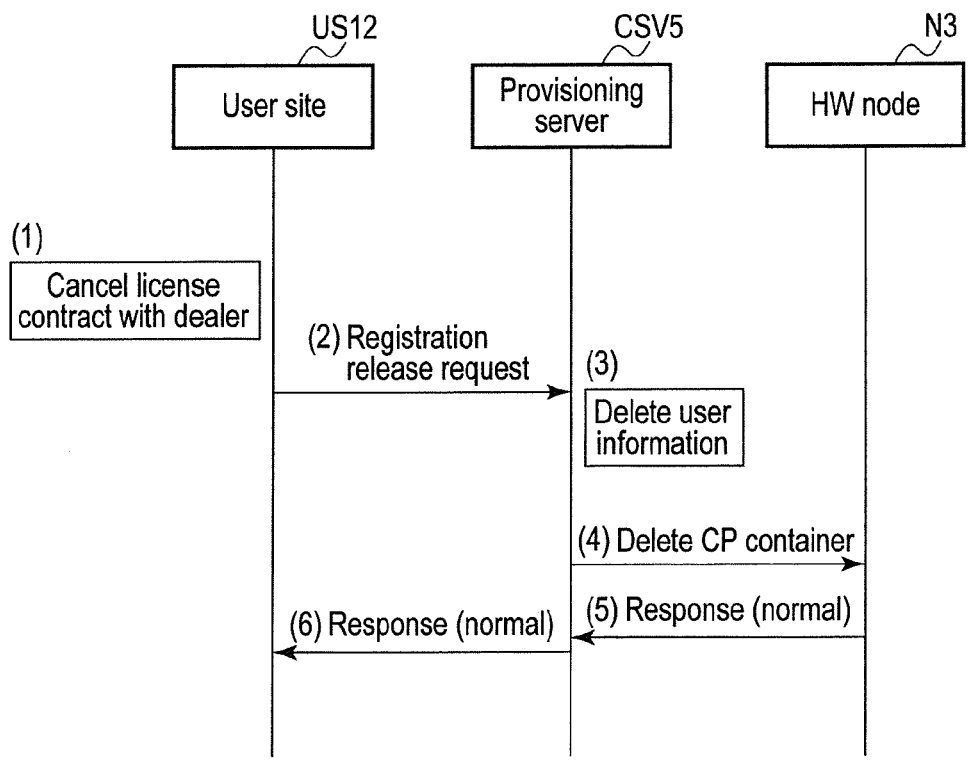
F I G. 11

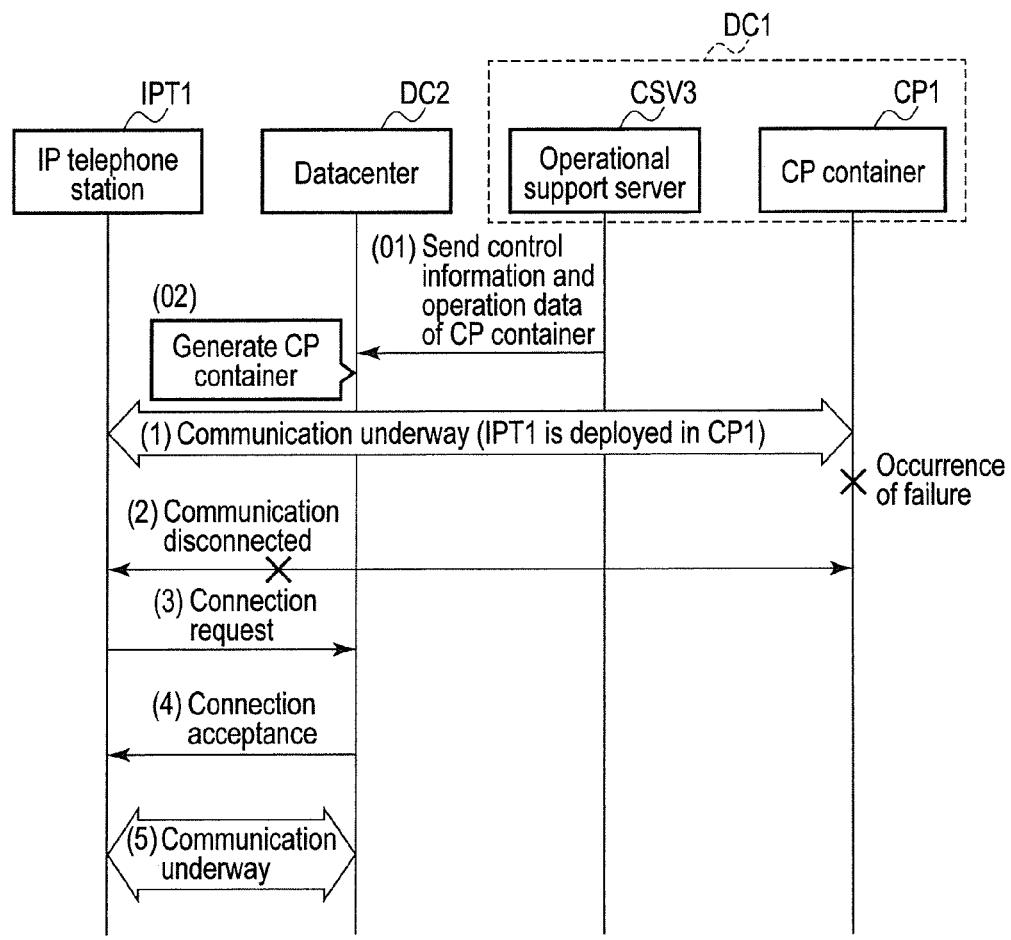
F I G. 12

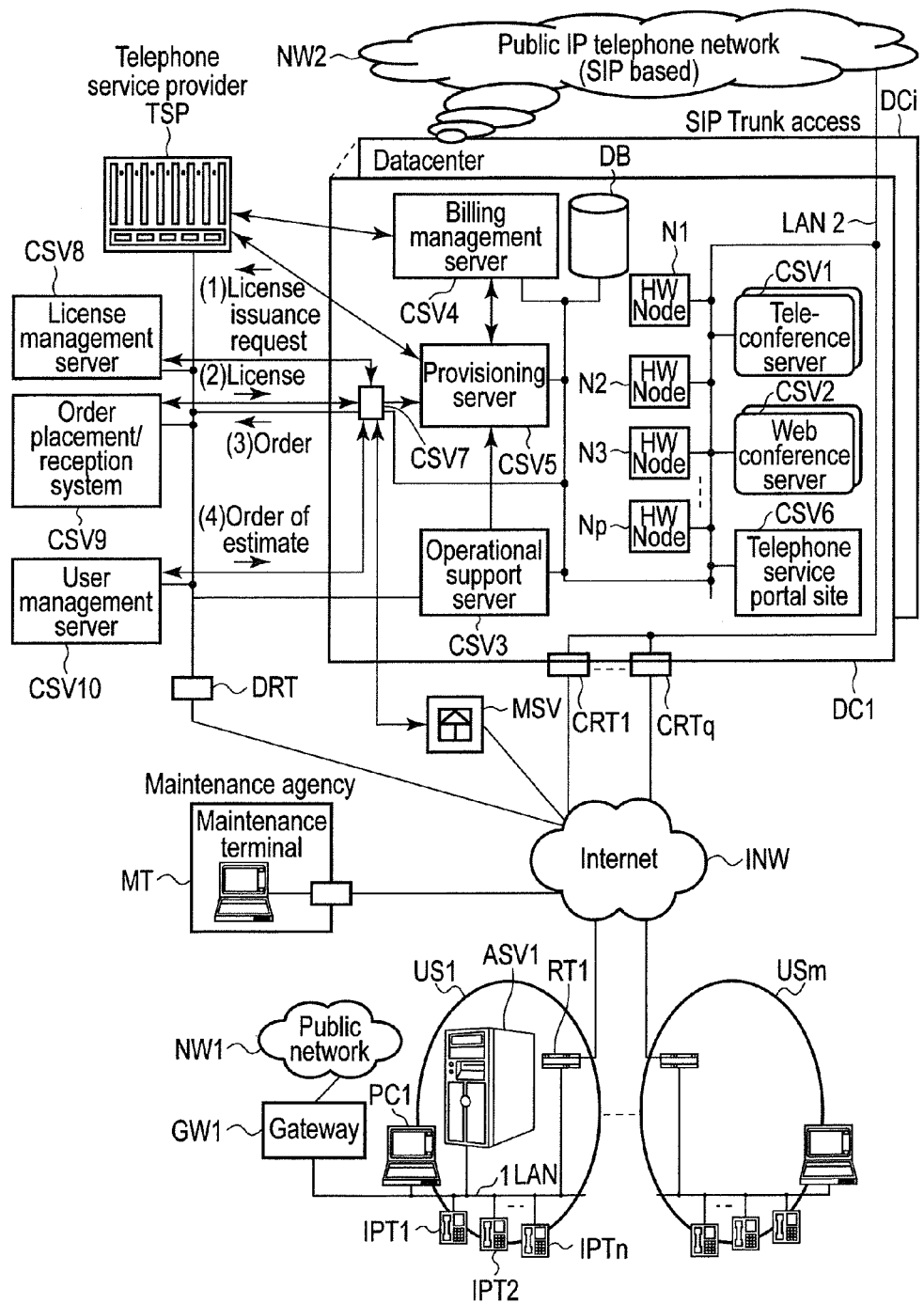
F I G. 13

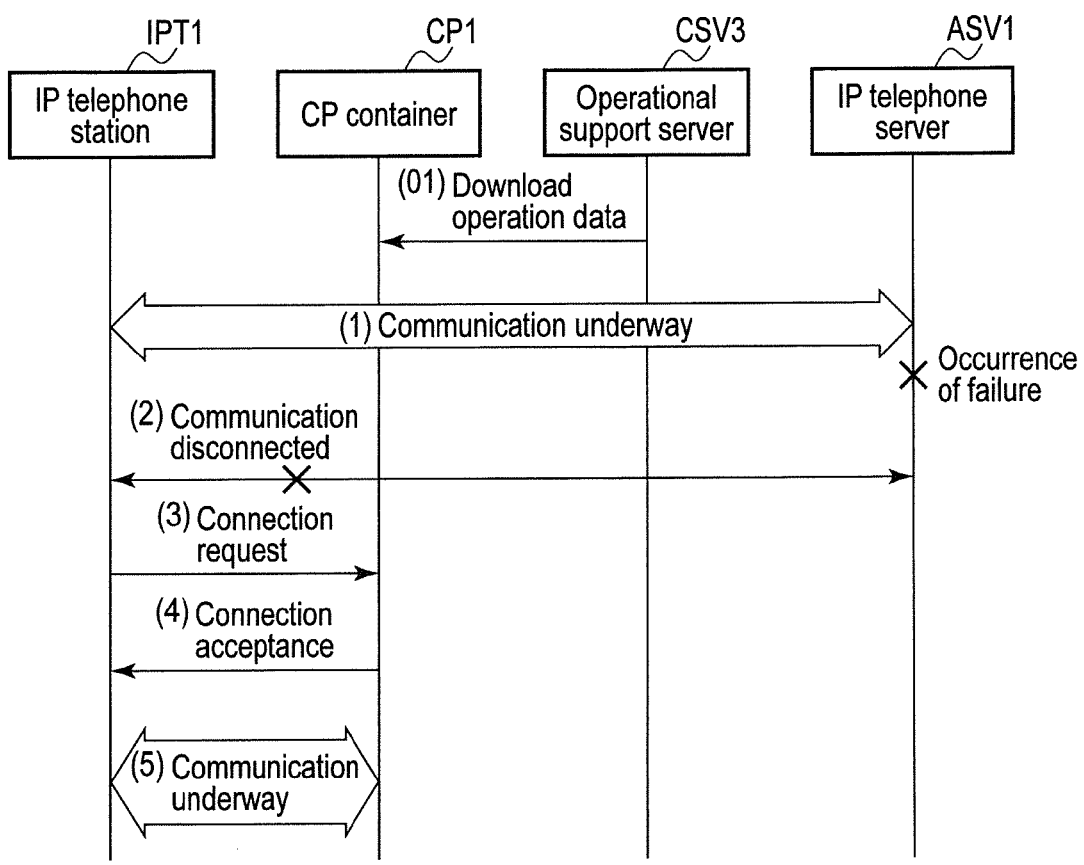
F I G. 15

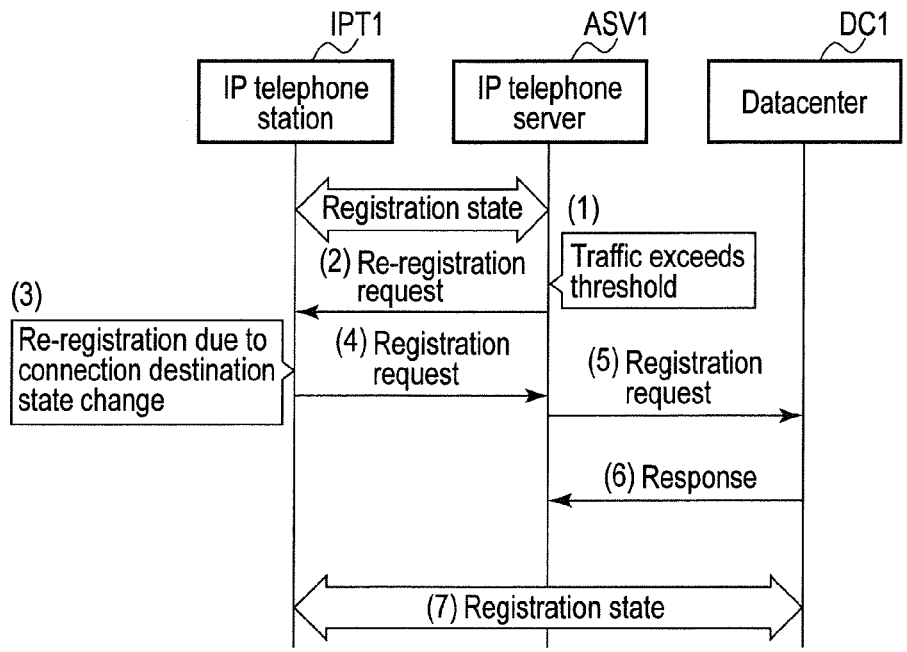
F I G. 16
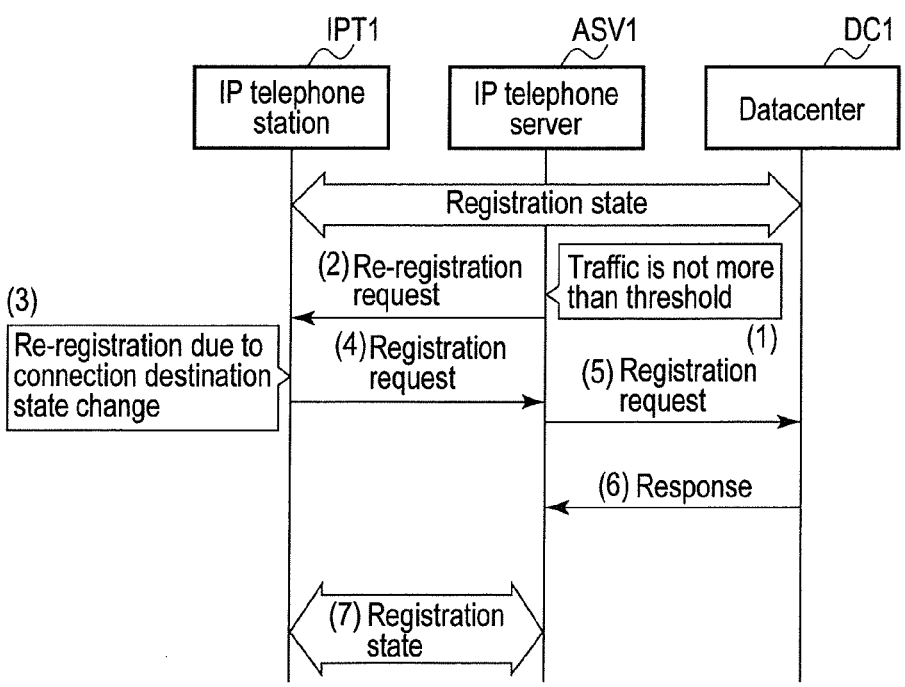
F I G. 17

COMMUNICATION SYSTEM, DATACENTER APPARATUS, AND CONTROL METHOD USED IN DATACENTER APPARATUS

CROSS-REFERENCE TO RELATED APPLICATIONS

This application is a Continuation Application of PCT Application No. PCT/JP2013/059788, filed Mar. 25, 2013 and based upon and claiming the benefit of priority from Japanese Patent Applications No. 2012-104085, filed Apr. 27, 2012; and No. 2012-248331, filed Nov. 12, 2012, the entire contents of all of which are incorporated herein by reference.

FIELD

Embodiments described herein relate generally to a communication system such as an Internet Protocol (IP) telephone system, a datacenter apparatus, and a control method used in the datacenter apparatus.

BACKGROUND

In recent years, IP telephone systems, which bidirectionally exchange image and audio data as packet data in realtime via Internet Protocol (IP) networks such as a LAN and the Internet, have prevailed. In this IP telephone system, for example, an IP telephone server is equipped for each company or individual user, and IP telephone stations can be registered for each IP telephone server. In such IP telephone system, not only inter-extension communications and outside outgoing/incoming call can be made but also those between IP telephone servers can be made via the IP network.

When each company or user purchases and uses an IP telephone server, an IP telephone server including functions required at that time is selected. However, after the beginning of use, functions of the IP telephone server are required to be added and unnecessary functions are required to be reduced according to an increase in personnel, a change in business content, and the like. Also, for each company or user, the number of IP telephone servers is required to be increased or decreased.

However, immediate addition/reduction of functions or expansion/reduction of IP telephone servers imposes a heavy load on each company or user side.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing the schematic arrangement of a communication system according to the first embodiment;

FIG. 3 is a table showing an example of storage contents of a user database shown in FIG. 1;

FIG. 4 is a view showing an assignment method of an Admin container, CP container, teleconference container, and Web conference container according to the first embodiment;

FIG. 5 is a flowchart showing the control sequence of a CP container until, for example, an IP telephone station is accommodated in a target CP container according to the first embodiment;

FIG. 6 is a sequence chart showing the sequence required to establish a communication connection between an IP telephone station and a telephone terminal on a public network according to the first embodiment;

FIG. 7 is a sequence chart showing an operation for executing registration destination change processing between an IP telephone station and the virtual host server according to the first embodiment;

FIG. 9 is a view showing the detailed arrangement of a virtual host server, teleconference server, and Web conference server according to the second embodiment;

FIG. 10 is a sequence chart showing operations among a user site, provisioning server, and virtual host server upon setting, for example, an Admin container and CP container in an empty virtual host server to cope with an increase in customers according to the third embodiment;

FIG. 11 is a sequence chart showing operations among the user site, provisioning server, and virtual host server upon deleting a CP container from the virtual host server according to the third embodiment;

FIG. 12 is a sequence chart showing a communication switching operation between an IP telephone station and another datacenter when a failure has occurred in a datacenter according to the fourth embodiment;

FIG. 13 is a block diagram showing the schematic arrangement of a communication system according to the fifth embodiment;

FIG. 15 is a sequence chart showing a communication switching operation between an IP telephone station, IP telephone server, and CP container when a failure has occurred in the IP telephone server at the user site according to the sixth embodiment;

FIG. 16 is a sequence chart showing operations for executing registration destination change processing among an IP telephone station, IP telephone server, and datacenter according to the seventh embodiment; and FIG. 17 is a sequence chart showing operations for executing registration destination change processing among an IP telephone station, datacenter, and IP telephone server according to the eighth embodiment.

DETAILED DESCRIPTION

Figure 2:
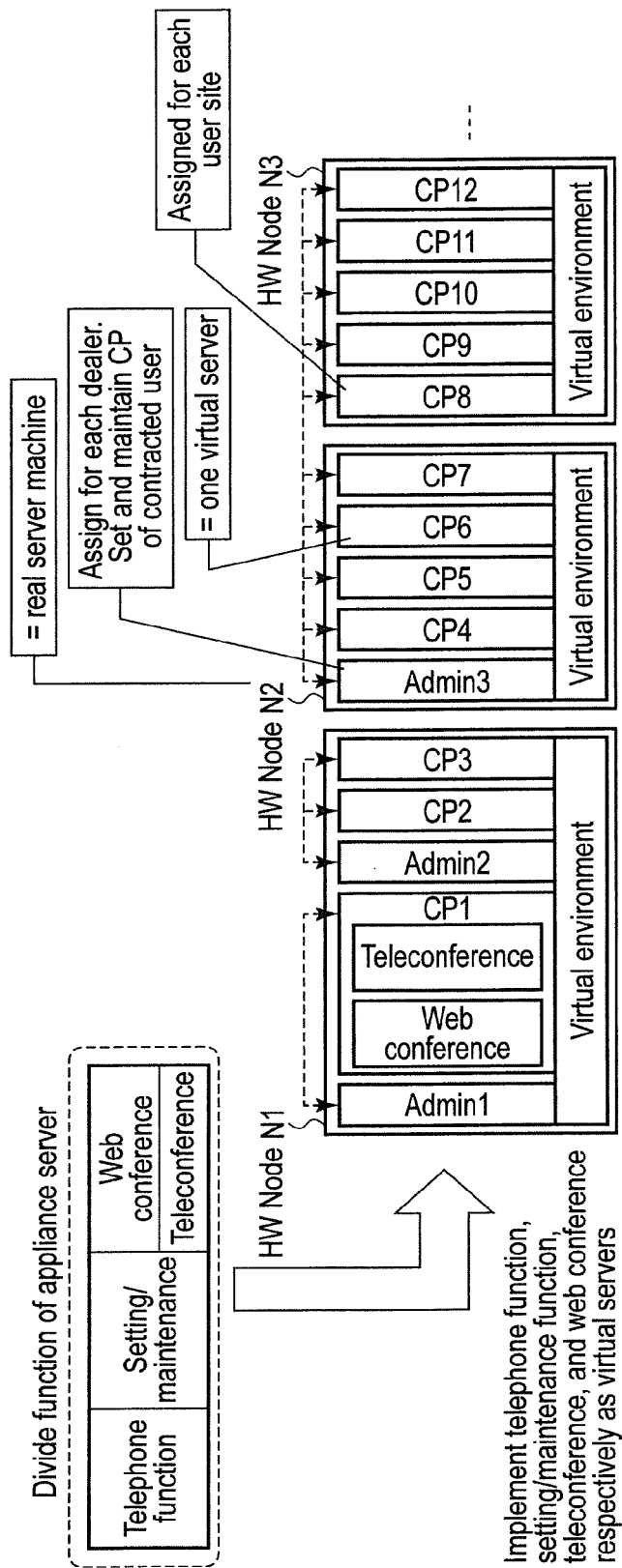
FIG. 2 is a view showing the functional arrangement of a virtual host server according to the first embodiment.

Various embodiments will be described hereinafter with reference to the accompanying drawings. In general, according to one embodiment, a communication system includes at least one user apparatus as a communication terminal and a datacenter apparatus. The datacenter apparatus is connected to the user apparatus via a communication network, and provides an arbitrary communication service to the user apparatus, wherein the arbitrary communication service is associated with exchange processing between communication terminals or between a communication terminal and a communication line. The datacenter apparatus includes a processor, a memory and a controller. The processor includes a plurality of containers required to execute a plurality of communication functions associated with the exchange processing between the communication terminals or between the communication terminal and the communication line. The memory stores a user ID used to identify the user apparatus.

The controller provides a communication service using at least one of the plurality of containers when a use request of the communication function is received from the user apparatus.

First Embodiment

The first embodiment will explain a system in which a server required to implement a telephone function, teleconference function, and Web conference function is assigned to a virtual host server as a server on a cloud without being arranged in a company as a customer or customer group, so as to implement the telephone function and the like.

A "customer" is, for example, a user unit which has made a contract with a dealer that provides a Mediation service with a telephone service provider. A "customer group" is a unit as a combination of the dealer and customers who have made a contract with that dealer.

FIG. 1 is a block diagram showing the schematic arrangement of a communication system according to this first embodiment. The system includes user sites US1 to USm, datacenters DC1 to DCi (i is a natural number) arranged on a cloud, and a telephone service provider TSP. The datacenters DC1 to DCi provide information processing services. Also, the telephone service provider TSP provides telephone services to customers using computer resources of the datacenters DC1 to DCi. A maintenance agency MT has made a contract with the telephone service provider TSP, gathers customers who want to use telephone services, and provides mediation services required to receive services of the telephone service provider TSP. The maintenance agency MT provides an on-site network establishment service, installation services of IP telephones and gateways, and data setting services according to customer's requests in addition to the mediation services.

The telephone service provider TSP and maintenance agency MT which manages users need not always be different companies, but they may be included in a single company.

The user site US1 will be described below on behalf of the user sites US1 to USm. The user site US1 includes IP telephone stations IPT1 to IPTn, a personal computer PC, and a router RT. These devices are connected to each other via a LAN 1. To this LAN 1, a gateway GW1 is connected. Note that each of the IP telephone stations IPT1 to IPTn is a telephone set which includes a call processing function and a media information processing function of video data and the like, and may be a softphone implemented by installing software required to implement a telephone function in a personal computer (PC). The gateway GW1 is required to connect between the LAN 1 and a public network NW1 such as an analog telephone network, and includes conversion functions of communication protocols and signal formats between the LAN 1 and public network NW1.

The router RT is connected to the Internet INW, and is further connected to the datacenters DC1 to DCi via the Internet INW. The datacenter DC1 will be described below on behalf of the datacenters.

The telephone service provider TSP has a dealer management function, user management function, license management function, and management function of order placement/reception of IP telephones and network devices. Also, the telephone service provider TSP has a remote maintenance function.

The datacenter DC1 is provided on the cloud. The datacenter DC1 is connected to an existing public IP telephone network NW2 via a communication network such as the Internet. Furthermore, the datacenter DC1 can mutually communicate with the datacenters DC2 to DCi of other companies. The datacenter DC1 includes virtual host servers (HW Node: hardware node) N1 to Np (p is a natural number), a teleconference server CSV1, a Web conference server CSV2, an operational support server CSV3, a billing management server CSV4, a provisioning server CSV5, routers CRT1 to CRTq (q is a natural number), and a user database DB, and connects them to each other via a LAN 2. The routers CRT1 to CRTq are connected to the Internet INW, and are further connected to the user sites US1 to USm via the Internet INW. Note that the virtual host servers N1 to Np, teleconference server CSV1, Web conference server CSV2, operational support server CSV3, billing management server CSV4, and provisioning server CSV5 need not always be physically independent servers, and a physically single server may assume a plurality of roles. The physical server arrangement of each of the teleconference server CSV1, Web conference server CSV2, operational support server CSV3, billing management server CSV4, and provisioning server CSV5 may include a plurality of servers since they are operated as virtual resources.

When an appliance type IP telephone server is virtually operated intact, virtually required computer resources (CPU use amount, memory use amount, and disk use amount) are large, and those for the specification of the appliance type IP telephone server×the number of servers are required. For this reason, about several to 10 virtual servers can only be operated per physical server.

Hence, in the first embodiment, functions of a general appliance type IP telephone server are mainly divided into a call control function, teleconference function, Web conference function, and operation and maintenance management function. Then, the call control function is accommodated in each CP container of the virtual host servers N1 to Np. The operation and maintenance function is consolidated in Admin containers of the virtual host servers N1 to Np. The teleconference function is consolidated in a teleconference server which is arranged in the datacenter while being separated from the virtual host servers N1 to Np. Furthermore, the Web conference function is consolidated in a Web conference server which is arranged in the datacenter while being separated from the virtual host servers N1 to Np. Note that the teleconference function and Web conference function realize three-way connections or more, is separated from the CP container which implements a telephone basic function such as an outgoing/incoming call, and is used as a common resource of a plurality of CP containers, thus improving diversion efficiency.

FIG. 2 is a view showing the detailed arrangement of the virtual host servers N1 to Np.

The virtual host servers N1 to Np are required to implement, as a basic function, a call control function for selectively connecting between the IP telephone stations IPT1 to IPTn of the contracted user site US1, and between these IP telephone stations IPT1 to IPTn and subscriber lines of the public network NW1.

The virtual host servers N1 to Np, teleconference server CSV1, and Web conference server CSV2 are implemented in the datacenter DC1 on the cloud by dividing the functions of the general appliance type IP telephone server arranged in each of the user sites US1 to USm.

Note that in one virtual host server N1, a virtual environment that allows a plurality of virtual servers to run on it is established. The virtual servers are provided with one or a plurality of Admin containers and CP containers depending on their functions and capacities.

Each CP container has a call control function as a basic function of the telephone function, voice mail function, emergency call control function, and the like. Although depending on the capacities and operation methods of the resources provided by the virtual servers, when a connection setting function between terminals for one conventional appliance type IP telephone server is accommodated in one CP container, it becomes easy to manage the CP container. Of course the CP container deployment method is not limited to this.

The operation and maintenance function is consolidated in Admin containers. Each Admin container has operation and maintenance functions including CP container setting and license management functions, setting functions of a teleconference and Web conference, and the like. The Admin container consolidates and accommodates the maintenance/operation functions provided to the conventional appliance type IP telephone server, and one container can maintain and manage a plurality of CP containers, that is, the user sites US1 to USm.

The teleconference server CSV1 has a function of establishing conference connections by means of audio information among the IP telephone stations IPT1 to IPTn of the contracted user site US1. The teleconference server CSV1 has a teleconference function, and is used as a common resource server which provides conference resources to a plurality of CP containers.

The Web conference server CSV2 has a function of establishing conference connections using media such as video information among the IP telephone stations IPT1 to IPTn of the contracted user site US1. The Web conference server CSV2 has a Web conference function, and is used as a common resource server which provides conference resources to a plurality of CP containers.

Referring back to FIG. 1, the operational support server CSV3 has automatic execution functions of monitoring, failure detection, maintenance, alarm notification, batch log collection, batch data backup, program updating, IP telephone station firmware updating, QoS monitoring, and the like of the virtual host servers N1 to Np, teleconference server CSV1, and Web conference server CSV2 based on the database DB. Furthermore, the operational support server CSV3 has a function of managing inventory information required for automation in a database.

The billing management server CSV4 has a metered billing function according to a use amount of the telephone function by the user, and acquires user information from the telephone service provider TSP to execute billing processing for the user.

The provisioning server CSV5 has a function of acquiring license information purchased by the user from the telephone service provider TSP, and assigning resources of the call control function, teleconference function, and Web conference function according to the number of purchased licenses. More specifically, as for the call control function, the provisioning server CSV5 assigns IP telephone stations (IPT) and IP trunk lines as many as the number of licenses. Also, the provisioning server CSV5 sets availability of the teleconference function and Web conference function or the teleconference server and Web conference server according to the users who have acquired the license.

Furthermore, the datacenter DC1 is provided with a telephone service portal site CSV6. The telephone service portal site CSV6 has an quoting function, a purchase order making function, an Admin container link function, and estimate settlement function. The estimate making function calculates an estimated amount when required devices, quantities, and services and are input based on a user request in the maintenance agency MT. In this state, when a "submit" button is pressed at the maintenance agency MT, the estimate is settled, and an estimate confirmation mail message is sent to the user.

The purchase order making function sends a license issuance request to the telephone service provider TSP when an order to the telephone service provider TSP is placed (the "submit" button is pressed) upon settlement of the user estimate at the maintenance agency MT, and sends an order instruction of IP telephones, routers, gateways, and the like. Then, the purchase order making function sends a CP container generation instruction to the provisioning server CSV5. At this time, the purchase order making function notifies the provisioning server CSV5 of the number of extensions, the number of trunk lines, and the number of conference channels.

The Admin container link function is a link required to open a maintenance console. The estimate settlement function authenticates the estimate made by the maintenance agency MT, and sends an estimate confirmation mail message to the maintenance agency MT when the user presses a "submit" button.

The maintenance agency MT on the Internet INW makes an estimate and issues an order request to the telephone service provider TSP using the telephone service portal site CSV6. Each of the user sites US1 to USm makes estimation and authentication using the telephone service portal site CSV6.

Furthermore, to the telephone service provider TSP, a license management server CSV8, order placement/reception system CSV9, and user management server CSV10 are connected. These license management server CSV8, order placement/reception system CSV9, and user management server CSV10 are connected to the Internet INW via a router DRT.

FIG. 3 shows the user database DB assured in the provisioning server CSV5. This user database DB stores, in association with a personal identification number (user ID) assigned to each user, an IP address assigned to the user, user setting resources (including settable resources: to be described later), a device identification number as secret information given to the user, a password as authentication information, login IP telephone stations IPT1 and IPT2, and serial numbers of the login IP telephone stations IPT1 and IPT2. Note that an example of the setting resources includes a call control function, voice mail function, emergency call control function, teleconference function, Web conference function, and the like.

Also, the operational support server CSV3, billing management server CSV4, and provisioning server CSV5 are connected to the telephone service provider TSP via, for example, the Internet INW.

Next, the virtual arrangement of the datacenter and the correspondence relationship between the dealer and user will be described below.

FIG. 4 shows the relationship between the maintenance agencies MT (to be described as "dealers" in FIG. 4) and users in contrast to the relationship among the Admin containers, CP containers, teleconference resources, and Web conference resources. In FIG. 4, one Admin container is assigned to each dealer.

Since a certain dealer manages a plurality of users, one Admin container has relations with a plurality of CP containers.

CP containers are assigned to the user sites US1 to USm. For example, when there are 10 extension terminals, the 10 terminals are accommodated in one CP container when they are used.

The operations in the above arrangement will be described below.

(Registration of User System)

In order to allow the user to use the system of this embodiment, the dealer negotiates a business deal. In the business negotiation, the dealer makes an estimate by asking the user for the required numbers of extension terminals and trunk lines, and whether or not to use additional functions (teleconference function, Web conference function, etc.) The dealer makes an estimate of a user system using the estimate making function of the telephone service portal site CSV6 managed by the telephone service provider TSP.

When the maintenance agency MT inputs the estimate contents and submits, for example, an e-mail message is sent from a mail server MSV to the user site US1. The sent mail message describes a use ID and password, and a link destination of a Web page, which are required for the user to access an estimate settlement page of the telephone service portal site CSV6. Then, the user clicks this link destination to be guided to the estimate settlement page of the telephone service portal site CSV6, and confirms details (the quantities of devices, monthly use fee, and initial fee) of the estimate. When the estimate has the desired contents, the user presses an OK button to settle the estimate.

After the user settles the estimate, an e-mail message is sent from the mail server MSV to the maintenance agency MT, thus informing the maintenance agency MT of settlement of the estimate.

The maintenance agency MT opens an order making page of the telephone service portal site CSV6. This order making page shows the contents of the estimate, which are approved by the user, and the maintenance agency MT presses an order request button, thus starting the following order placement processing.

An estimate order server CSV7 sends a license issuance request to the license management server CSV8 (FIG. 1(1)). Then, the license management server CSV8 sends license information to the estimate order server CSV7 (FIG. 1(2)).

The estimate order server CSV7 places an order of IP telephones, routers, gateways, and the like of the telephone service provider TSP to the order placement/reception system CSV9 (FIG. 1(3)). After the user management server CSV10 confirms stock statuses based on the received order, and sends an order result to the estimate order server CSV7 (FIG. 1(4)). The estimate order server CSV7 displays the order result on an order result field of an order result display page of the telephone service portal site CSV6, thus informing the maintenance agency MT of completion of the order or waiting for delivery due to stock shortage.

The estimate order server CSV7 sends a data setting request of the user system to the provisioning server CSV5. Upon reception of the data setting request, the provisioning server CSV5 selects a hardware node having the smallest number of accommodated CP containers or Admin containers from hardware nodes, and applies processing to that hardware node in the following order.

(1) A virtual server is generated.

(2) CP container software is loaded to the virtual server.

(3) Application software is launched.

(4) Operation data (default data required to operate the basic function) are set.

(5) The license information issued by the license management server CSV8 is applied.

Then, the provisioning server CSV5 also sets use permission/inhibition of the teleconference function and Web conference function.

Upon completion of these settings, the user is ready to use the call control function, teleconference function, or Web conference function.

(Login Operation)

FIG. 5 is a flowchart showing the control sequence of a CP container until, for example, the IP telephone station IPT1 is accommodated in a target CP container.

The user opens an IPT terminal registration page of the telephone service portal site CSV6 and registers a system ID (container ID) of the user and a serial number assigned to the IP telephone station IPT1 as a preparation required to accommodate the IP telephone station IPT1 in a target CP container. These data are registered in the user database DB of the provisioning server CSV5. Normally, the maintenance agency MT undertakes this setting operation as a part of installation operations.

The user allocates a DHCP server on a network which accommodates IP telephone stations, and sets that server to return an IP address of the IP telephone station IPT1 and that of a DNS server.

After completion of the above advance preparation, when the IP telephone station is connected to the network, the IP telephone station IPT1 acquires an IP address from the DHCP server, and sets it as that of the self terminal. Also, the IP telephone station acquires an IP address of the DNS server from the DHCP server.

In this case, in order to determine whether or not a CP container as an deployment destination is to be searched for, whether or not data at the time of factory shipping remain is confirmed. A factory shipping state is judged since an extension number of the IP telephone station is blank, and an IP address of a connection destination CP container indicates 0.0.0.0.

Next, at the IP telephone station IPT1, the user issues an IP address acquisition request to the provisioning server CSV5 so as to obtain an IP address of an deployment destination CP container. At this time, the IP telephone station IPT1 resolves a DNS address using a host name of the provisioning server CSV5, so as to obtain an IP address of the provisioning server CSV5.

When the provisioning server CSV5 receives the IP address acquisition request of a CP container from the IP telephone station IPT1, it searches the user database DB for an IPT extension having the corresponding serial number, derives an IP address of a CP container which accommodates that terminal, and returns this address to the IP telephone station IPT1 while being included in an IP address response message.

The IP telephone station IPT1 stores the acquired IP address of the CP container by itself, and communicates with the CP container using that address, thus taking deployment procedures. Initially, upon reception of an incoming login request from the IP telephone station IPT1 (block ST5a-1), the CP container prompts the user to input an extension number (block ST5a-2). The user operates a dial pad of the IP telephone station IPT1 to input the extension number, and presses an input completion button.

Next, the IP telephone station IPT1 prompts the user to input a password. Upon completion of the password input, the IP telephone station IPT1 stores the extension number and password in its internal memory, and sends a registration request message including the extension number and password to the CP container.

Upon reception of the registration request message (block ST5a-3), the CP container checks whether or not the extension number is correct (block ST5b). If the extension number is incorrect (NG), the CP container returns an error message to the IP telephone station IPT1 (block ST5c); otherwise (OK), it checks whether or not the extension number has already been used (block ST5d). If the extension number is unused (OK), the CP container checks the password (block ST5e). If the password is correct (OK), the CP container stores the password in a password field of the user database DB, permits the login, and returns a registration permission message to the IP telephone station IPT1 (block ST5f).

Upon reception of the registration permission message, the IP telephone station IPT1 is set in a login state, and communicates with the CP container by user operations to set the login state, that is, a state in which a call control service is ready to provide.

(Call Operation)

FIG. 6 is a sequence chart showing the sequence required to establish a communication connection between, for example, the IP telephone station IPT1 and a telephone terminal TT1 on the public network NW1.

Now assume that, for example, the user makes an outgoing call operation from the login IP telephone station IPT1 to another external telephone terminal TT1 (FIG. 6(1)). Then, an off-hook signal of the IP telephone station IPT1 is sent to the CP container (CP1) which accommodates the IP telephone station IPT1.

This off-hook signal is processed on the CP container (CP1). In this case, since an off-hook operation is made from an empty state of the IP telephone station IPT1, outgoing call processing is activated, and the outgoing call processing with respect to the IP telephone station IPT1 is executed.

Then, this CP container (CP1) sends a dial tone output instruction signal to the IP telephone station IPT1. Also, the CP container (CP1) is ready to receive a dial operation from the IP telephone station IPT1.

In this state, when the user, who confirmed a dial tone, of the IP telephone station IPT1 makes a dial operation, a dial signal is sent to the CP container (CP1) and undergoes dial analysis processing. Every time a dial of the IP telephone station IPT1 is continuously operated, the CP container (CP1) repeats dial analysis, and continues dial analysis until a route (outgoing trunk line) is decided.

After the route (trunk line channel) is decided, the CP container (CP1) sends an outgoing call message to the SIP public network NW1. The outgoing call message is transferred to the SIP public network NW1 via the gateway GW1 (FIG. 6(2)). The SIP public network NW1 appropriately processes the outgoing call message from a subscriber, and sends a call message so as to call the other subscriber terminal TT1. Upon reception of the call message, the subscriber terminal TT1 rings in response to an incoming call (FIG. 6(3)). When the user of the subscriber terminal TT1 answers the call (FIG. 6(4)), a response message is sent to the SIP public network NW1. The SIP public network NW1 sends the response message to the calling subscriber. The response message is sent to the CP container (CP1) in the datacenter DC1 via the gateway GW1.

The CP container (CP1) executes processing required to connect a communication path between the IP telephone station IPT1 as a caller and the SIP public network NW1 (FIG. 6(5)). In this manner, the user of the IP telephone station IPT1 can talk with that of the subscriber terminal TT1.

A use method of teleconference media resources in the CP container (CP1) when the user makes an operation for adding an IP telephone station IPT2 to a conference call at the IP telephone station IPT1 during voice communications with the subscriber terminal TT1 will be described below.

When the user of the IP telephone station IPT1 operates a conference button of the IP telephone station IPT1, the CP container (CP1) is notified of that operation. The CP container (CP1), which detected the conference button operation, sends a disconnection instruction of an audio stream of the IP telephone station IPT1 to the IP telephone station IPT1, and also sends a dial tone generation control signal to the IP telephone station IPT1.

Furthermore, the CP container (CP1) captures a media resource for one channel (Ch-i) from the teleconference function, and issues, to that channel, an instruction to reproduce a Music On Hold tone and to supply a reproduced audio stream to Ch-X of the SIP public network NW1. After the above processing, the user at the subscriber terminal TT1 listens to the Music On Hold tone.

After the user of the IP telephone station IPT1 listens to the dial tone, he or she operates a dial to call out a conference member. The CP container (CP1) is notified of this dial operation, and calls out a member (the IP telephone station IPT2 in this case) after the conference member is specified.

When the user of the IP telephone station IPT2 answers the call, the CP container (CP1) forms an audio stream between the IP telephone stations IPT1 and IPT2. When the user operates the conference button of the IP telephone station IPT1 from this state, the CP container (CP1) instructs the media resource (Ch-i) to stop the Music On Hold tone and releases the media resource (Ch-i).

Next, the CP container (CP1) captures media resources (for three channels in this case) as many as the number of conference members from the teleconference function. The CP container (CP1) instructs the media resources (Ch-i, Ch-j, and Ch-k) to establish conference connections, instructs to form an audio stream between the media resource (Ch-i) and IP telephone station IPT2, instructs to form an audio stream between the media resource (Ch-j) and IP telephone station IPT2, and instructs to form an audio stream between the media resource (Ch-k) and the resource (Ch-X) of the SIP public network NW1. Thus, the CP container arranges a three-way conference with the inclusion of the subscriber terminal TT1 of the external user.

In response to an on-hook operation of the conference member, the CP container (CP1) releases the media resources (Ch-i, Ch-j, and Ch-k), and disconnects the audio streams.

(Movement of CP Container Upon Increase/Decrease in Traffic)

FIG. 7 is a sequence chart showing operations for executing registration destination change processing between the IP telephone station IPT1 and virtual host server.

Now assume that the IP telephone station IPT1 is registered in the CP container (CP1) of the virtual host server N1. In this state, the operational support server CSV3 periodically measures loads on the virtual host servers N1 to Np (FIG. 7(1)). Also, the operational support server CSV3 periodically measures loads on CP containers (FIG. 7(2)).

In this case, when the operational support server CSV3 judges that the load on the virtual host server N1 has exceeded a threshold (FIG. 7(3)), it registers a CP container in a move list in turn from that with the lightest load of CP containers (CP1 to CP3) deployed in the virtual host server N1 (FIG. 7(4)).

After that, the operational support server CSV3 checks during a time zone with a low night load whether or not a CP container registered in the move list has a busy call and undergoes a maintenance operation (FIG. 7(5)). If that CP container neither has a busy call nor undergoes a maintenance operation, the operational support server CSV3 backs up the operation data of that CP container. Then, the operational support server CSV3 generates a CP container in a virtual host server N18 with a lowest frequency load (FIG. 7(6)), and restores the previously backed-up operation data.

Upon completion of restoration of the operation data (FIG. 7(7)), the CP container of the virtual host server N18 notifies the operational support server CSV3 of completion (FIG. 7(8)). After completion of data restoration of the CP container, the operational support server CSV3 registers a relationship between a host name and real IP address of the CP container after movement in the DNS server (FIG. 7(9)).

The operational support server CSV3 sends a registration notification to all the IP telephone stations IPT1 to IPTn deployed in the moved CP container, and prompts them to re-register the changed CP container (FIG. 7 (10)).

Upon reception of the registration change notification, the IP telephone station IPT1 sends a re-registration request to the CP container after movement (FIG. 7(11)). The CP container of the virtual host server N18 registers the IP telephone station IPT1 corresponding to the re-registration request, and returns a response to the IP telephone station IPT1 (FIG. 7(12)).

The operational support server CSV3 deletes the corresponding CP container from the move list, and repeats the aforementioned processes until no CP container remains in the move list (FIG. 7(13)).

Thus, the IP telephone station IPT1 is registered in the CP container after movement (FIG. 7(14)).

As described above, by re-allocating CP containers in consideration of the highest frequency loads in the virtual host servers N1 to Np, although the frequencies of use cannot be estimated from the contracts of users, since the traffics are detected by actual operations, CP containers with lighter loads are moved, and busy calls and maintenance states are confirmed, thus allowing safe movements without influencing the operations of users.

(Communication Switching Operation Upon Occurrence of Failure During Communication)

Figure 8:
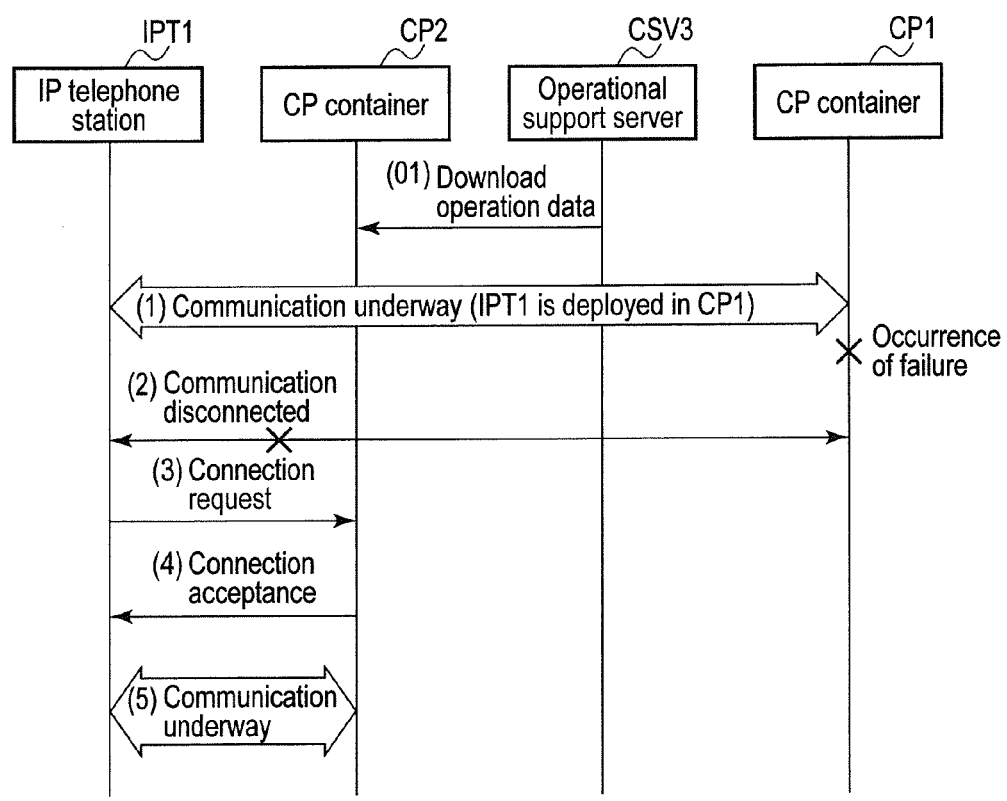
FIG. 8 is a sequence chart showing a communication switching operation between an IP telephone station and CP container when a failure has occurred in the CP container.

FIG. 8 is a sequence chart showing a communication switching operation between the IP telephone station IPT1 and CP container when a failure has occurred in the CP container.

In this case, when the user of the IP telephone station IPT1 wants to receive a standby service, the operational support server CSV3 generates a standby CP container (CP2), and downloads operation data to the CP container CP2 (FIG. 8(01)).

Now assume that the IP telephone station IPT1 as an extension terminal and the subscriber terminal TT1 on the SIP public network NW1 talk with each other via the CP container (CP1) of the virtual host server N1 (FIG. 8(1)). In this state, the IP telephone station IPT1 monitors a failure of the CP container (CP1). As a failure monitoring method, the following method is used. That is, an Admin container (Admin1) of the virtual host server N1 detects a failure of the CP container (CP1) during communications, and whether or not this detection result can be received is monitored.

Assume that a failure has occurred in the CP container (CP1) in this state, and occurrence of the failure is detected by the IP telephone station IPT1 (FIG. 8(2)). Then, the IP telephone station IPT1 sends a connection request signal to the CP container (CP2) so as to cause the CP container (CP2) of the virtual host server N1 to transfer communications (FIG. 8(3)).

Upon reception of the connection request signal from the IP telephone station IPT1, the CP container (CP2) starts processing for taking over communications between the IP telephone station IPT1 and the subscriber terminal TT1 on the SIP public network NW1. Then, the CP container (CP2) sends a connection acceptance signal to the IP telephone station IPT1 (FIG. 8(4)). At this time, in this connection acceptance signal, information indicating that the communication takeover has succeeded, for example, "normal", is inserted as a release reason. The IP telephone station IPT1 can recognize based on this information that the communications are normally taken over.

In this manner, the CP container (CP1) is switched to the CP container (CP2), and the IP telephone station IPT1 and the subscriber terminal TT1 on the SIP public network NW1 can continuously talk with each other via the CP container (CP2) (FIG. 8(5)).

Note that the case has been exemplified wherein the communication service is taken over to the CP container (CP2) generated in the same virtual host server N1. Alternatively, the communication service may be taken over to a CP container (CP4) of another virtual host server N2.

As described above, according to the first embodiment, the plurality of user sites US1 to USm are deployed in the datacenter DC1 via the Internet INW, and appliance type IP telephone servers normally equipped in the user sites US1 to USm are shared by the virtual host servers N1 to Np already equipped in the datacenter DC1. Then, the plurality of virtual host servers N1 to Np are divided into a plurality of CP containers, the CP container (CP1) is exclusively assigned to the user site US1, the CP container (CP2) is exclusively assigned to the user site US2, and the CP containers (CP1) and (CP2) provide arbitrary communication services to the user sites US1 and US2 via the Internet INW.

Therefore, the need for dedicated appliance type IP telephone servers can be obviated from the user sites US1 to USm, and also the needs for business trips and manual operations of maintenance service persons for maintenance of the appliance type IP telephone servers can be obviated, thus reducing installation cost. On the other hand, for the datacenter DC1, the need for separate preparation of dedicated servers for the user sites US1 to USm can be obviated, and the inexpensive datacenter DC1 with the simple arrangement can be provided. Furthermore, for the datacenter DC1, the virtual host servers N1 to Np are divided into a plurality of CP containers, thus reducing the CPU use amount, memory use amount, and disk use amount specialized to the call control function.

Also, according to the first embodiment, when the traffics of the user sites US1 and US2 registered in the single virtual host server N1 are increased, the user sites US1 and US2 are registered in, for example, a vacant virtual host server N18, thereby reducing the processing load on the virtual host server N1. When the use amounts by the user site US1 registered in the virtual host server N1 are small, the user site US1 can be integrally registered in, for example, the virtual host server N2, thus creating the virtual host server N1 whose operation is not required. Then, this virtual host server N1 is changed to a power saving mode, thereby reducing the power consumption of the overall datacenter DC1.

Furthermore, according to the first embodiment, even when a failure has occurred in the CP container (CP1) to disable to continue the communication service, the normal CP container (CP2) can continuously provide the communication service to the user site US1.

Second Embodiment

In the second embodiment, a teleconference function and Web conference function are operated by dedicated servers.

FIG. 9 shows the detailed arrangement of virtual host servers N1 to N2, a teleconference server CSV1, and a Web conference server CSV2 according to the second embodiment.

A single virtual host server N1 includes a virtual environment, and a plurality of virtual servers operate on that environment. In this case, the teleconference server CSV1 operates using an actual server without using a virtual server. The teleconference server CSV1 has a teleconference function, and can be shared from a plurality of CP containers. A plurality of teleconference servers may be equipped.

The Web conference server CSV2 also operates using an actual server without using a virtual server. The Web conference server CSV2 has a Web conference function, and can be shared from a plurality of CP containers. A plurality of Web conference servers CSV2 may be equipped.

In the first embodiment, the teleconference function and Web conference function are included in a CP container. In the second embodiment, the teleconference function (to be referred to as a teleconference application hereinafter) and Web conference function (to be referred to as a Web conference application) are configured independently from a call control application as follows.

(1) The teleconference application mainly controls communications of audio packets with IP end points of conference participating members so as to use message communications on an IP network as a conference control interface.

(2) The teleconference application manages the number of conference lines, and the call control application issues an acquisition request of the required number of conference lines from the teleconference application.

(3) The maximum number of conference lines of the teleconference application is not limited, and an upper limit of the number of lines can be changed depending on the processing performance of server hardware installed with the teleconference application.

The teleconference server CSV1 is a server which exclusively provides the teleconference function. Compared to the first embodiment above, the second embodiment strengthens the processing performance of the server to increase the number of conference lines to be provided by the teleconference server CSV1. With this arrangement, the following effects are obtained.

(1) By removing the teleconference application from CP containers, a file system size of each container can be reduced, and an integration ratio of CP containers in the virtual host servers N1 to Np can be improved.

(2) By removing the teleconference application from CP containers, audio processing which consumes the processing performance can be excluded, and the integration ratio of CP containers in the virtual host servers N1 to Np can be improved.

(3) Since the teleconference application has different consumption amounts of conference lines depending on use modes of users and business configurations, the number of conference lines required for all the virtual host servers N1 to Np can be reduced. This leads to a reduction of the required number of servers (a reduction of operation cost).

The operation in the above arrangement will be described below.

Now assume that, for example, the user makes an operation for adding an IP telephone station IPT2 to a conference call at an IP telephone station IPT1 during voice communications with a subscriber telephone TT1. Then, a CP container (CP1) is notified of this operation. The CP container (CP1), which detected a conference button operation, sends a disconnection instruction of an audio stream of the IP telephone station IPT1 to the IP telephone station IPT1, and also sends a dial tone generation control signal to the IP telephone station IPT1.

Furthermore, the CP container (CP1) captures a media resource for one channel (Ch-i) from the teleconference server CSV1, and issues, to that channel, an instruction to reproduce a Music On Hold tone and to supply a reproduced audio stream to Ch-X of an SIP public network NW1. After the above processing, the user at the subscriber terminal TT1 listens to the Music On Hold tone.

After the user of the IP telephone station IPT1 listens to the dial tone, he or she operates a dial to call out a conference member. The CP container (CP1) is notified of this dial operation, and calls out a member (an IP telephone station IPT2 in this case) after the conference member is specified.

When the user of the IP telephone station IPT2 answers the call, the CP container (CP1) forms an audio stream between the IP telephone stations IPT1 and IPT2. When the user operates a conference button of the IP telephone station IPT1 from this state, the CP container (CP1) instructs the media resource (Ch-i) to stop the Music On Hold tone and then releases the media resource (Ch-i).

Next, the CP container (CP1) captures media resources (for three channels in this case) as many as the number of conference members from the teleconference server CSV1. The CP container (CP1) instructs the media resources (Ch-i, Ch-j, and Ch-k) to establish conference connections, instructs to form an audio stream between the media resource (Ch-i) and IP telephone station IPT2, instructs to form an audio stream between the media resource (Ch-j) and IP telephone station IPT2, and instructs to form an audio stream between the media resource (Ch-k) and the resource (Ch-X) of the SIP public network NW1. Thus, the CP container arranges a three-way conference with the inclusion of the subscriber terminal TT1 of the external user.

In response to an on-hook operation of the conference member, the CP container (CP1) releases the media resources (Ch-i, Ch-j, and Ch-k), and disconnects the audio streams.

As described above, according to the second embodiment, the same effects as in the first embodiment above can be obtained, and the teleconference server CSV1 set with the teleconference function and the Web conference server CSV2 set with the Web conference function can be shared by the plurality of user sites US1 to USm, thereby reducing the required number of servers for the datacenter DC1 as a whole.

Third Embodiment

Addition of Container Upon Increase in Customer Group

Assume that a dealer 1 manages a user site US1, a dealer 2 manages user sites US2 and US3, and a dealer 3 manages user sites US4 to US12. Furthermore, when new customers to be contracted increase from now, for example, a telephone service provider TSP which manages a datacenter DC1 on a cloud is required to entrust a new dealer 4 to perform maintenance operations.

FIG. 10 is a sequence chart showing operations among a user site US13, provisioning server CSV5, and virtual host server N4 when, for example, an Admin container (Admin4) and CP containers are set in an empty virtual host server N4 upon an increase in number of customers.

For example, the telephone service provider TSP which manages the datacenter DC1 on the cloud detects an empty virtual host server, and sets an Admin container (Admin4) in, for example, the empty virtual host server N4 (FIG. 10(1)).

Then, the telephone service provider TSP entrusts a dealer which possesses the Admin container (Admin4) to sell a license that a new customer (user) to be contracted wants to purchase.

The user of the user site US13 makes a maintenance contract with the dealer which possesses the Admin container (Admin4), and purchases a license (FIG. 10(2)).

The dealer operates a personal computer of the user site US13 according to the contract contents with the user, so as to send, to the provisioning server CSV5 of the datacenter DC1 on the cloud, a registration request including a personal identification number of the contracted user, an IP address assigned to the user, setting resources (including settable resources) desired by the user, a device identification number given to the user, and a password (FIG. 10(3)).

Upon reception of the registration request from the user site US13, the provisioning server CSV5 of the datacenter DC1 registers, in the user database DB, the personal identification number and IP address of the user, the setting resources desired by the user, the device identification number, and the password, all of which are included in the registration request (FIG. 10(4)).

In response to the operation at the user site US13, the provisioning server CSV5 of the datacenter DC1 controls the Admin container (Admin4) of the virtual host server N4 to generate a required CP container (CP13) on the virtual host server N4 (FIG. 10(5)). Also, the provisioning server CSV5 sets the use permission/inhibition of a teleconference function and Web conference function.

When the virtual host server N4 ends the setting processing of the CP container (CP13), it returns a response indicating that the setting processing is normally complete to the provisioning server CSV5 (FIG. 10(6)). Upon reception of the response indicating that the setting processing is normally complete, the provisioning server CSV5 sends a response indicating that the setting processing is normally complete to the personal computer of the user site US13 (FIG. 10(7)).

In this manner, the user of the user site US13 can use the CP container (CP13) in the datacenter DC1 on the cloud.

Furthermore, assume that a user of a user site US14 makes a contract with the dealer which possesses the Admin container (Admin4) and purchases a license. Then, the dealer operates a personal computer of the user site US14 according to the contract contents with the user, and registers information of the contracted user in the user database DB.

In response to the operation at the user site US14, the provisioning server CSV5 of the datacenter DC1 controls the Admin container (Admin4) of the virtual host server N4 to generate a required CP container (CP14) on the virtual host server N4.

On the other hand, assume that the virtual host server N4 is filled up with CP containers (CP13) to (CP16). In this state, assume that, for example, a user of a user site US17 makes a contract with the dealer which possesses the Admin container (Admin4) and purchases a license. Then, the dealer operates a personal computer of the user site US17 according to the contract contents with the user, and registers information of the contracted user in the user database DB.

In response to the operation at the user site US17, the provisioning server CSV5 of the datacenter DC1 controls the Admin container (Admin4) of the virtual host server N4 to generate a required CP container (CP17) on an empty virtual host server N5.

(Reduction of CP Container Upon Decrease in Customer Group)

FIG. 11 is a sequence chart showing the operations among the user site US12, provisioning server CSV5, and virtual host server N3 upon deleting a CP container (CP12) from the virtual host server N3.

Assume that the user of the user site US12 cancels a contract with a dealer which possesses an Admin container (Admin3) (FIG. 11(1)).

The dealer operates a personal computer of the user site US12 according to the contract contents with the user, so as to send a registration cancel request including a personal identification number of the contracted user to the provisioning server CSV5 of the datacenter DC1 on the cloud (FIG. 11(2)).

Upon reception of the registration cancel request from the user site US12, the provisioning server CSV5 of the datacenter DC1 deletes information of the user corresponding to the personal identification number of the user included in the registration cancel request from the user database DB (FIG. 11(3)).

In response to the operation at the user site US12, the provisioning server CSV5 of the datacenter DC1 controls the Admin container (Admin3) of a virtual host server N3 to delete the required CP container (CP12) on the virtual host server N3 (FIG. 11(4)). Also, when the teleconference function and Web conference function are set, the provisioning server CSV5 also cancels settings of the teleconference function and Web conference function.

Upon completion of the delete processing of the CP container (CP12), the virtual host server N3 returns a response indicating that the delete processing is normally complete to the provisioning server CSV5 (FIG. 11(5)). Upon reception of the response indicating that the delete processing is normally compete, the provisioning server CSV5 sends a response indicating that the delete processing is normally complete to the personal computer of the user site US12 (FIG. 11(6)).

In this way, the user of the user site US12 can no longer use the CP container (CP12) in the datacenter DC1 on the cloud.

As described above, according to the third embodiment, when the number of user sites is increased, CP containers as many as the number of increased user sites are set on the virtual host servers N1 to Np. When the number of user sites US1 to USm is decreased, CP containers corresponding to the decreased user sites need only be deleted from the virtual host servers N1 to Np. Hence, the need for purchasing new dedicated servers or discarding the servers in use can be obviated, thus reducing cost required for business investment.

Fourth Embodiment

In the fourth embodiment, when a failure has occurred in a datacenter, communications are continued by another normal datacenter.

(Communication Switching Operation Upon Occurrence of Failure During Communications)

FIG. 12 is a sequence chart showing a communication switching operation between an IP telephone station IPT1 and another datacenter when a failure has occurred in a datacenter.

In this case, when the user of the IP telephone station IPT1 wants to receive a standby service, an operational support server CSV3 of a datacenter DC1 generates control information required to generate a standby CP container, and sends the control information and operation data to a datacenter DC2 via a communication network such as the Internet (FIG. 12(01)). The control information includes an extension number and IP address of the IP telephone station IPT1, use-permitted functions, and the like. Upon reception of the control information and operation data, the datacenter DC2 generates a CP container in a virtual host server based on the control information, and sets the operation data in the CP container (FIG. 12(02)).

Assume that the IP telephone station IPT1 as an extension terminal and a subscriber terminal TT1 on an SIP public network NW1 talk with each other via a CP container (CP1) of a virtual host server N1 (FIG. 12(1)). In this state, the IP telephone station IPT1 monitors a failure of the datacenter DC1 including the CP container (CP1).

Now assume that a failure has occurred in the datacenter DC1 in this state, and occurrence of the failure is detected by the IP telephone station IPT1 (FIG. 12(2)). Then, the IP telephone station IPT1 sends a connection request signal to a CP container of the datacenter DC2 so as to transfer communications to the CP container of the datacenter DC2 (FIG. 12(3)).

Upon reception of the connection request signal from the IP telephone station IPT1, the CP container of the datacenter DC2 starts processing for taking over communications between the IP telephone station IPT1 and the subscriber terminal TT1 on the SIP public network NW1. Then, the CP container of the datacenter DC2 sends a connection acceptance signal to the IP telephone station IPT1 (FIG. 12(4)). At this time, in this connection acceptance signal, information indicating that takeover processing of the communications has succeeded, for example, "normal" is inserted as a release reason. The IP telephone station IPT1 can recognize based on this information that the communications can be normally taken over.

In this way, the CP container (CP1) of the datacenter DC1 is switched to the CP container of the datacenter DC2, and the IP telephone station IPT1 and the subscriber terminal TT1 on the SIP public network NW1 can continuously talk with each other via the CP container of the datacenter DC2 (FIG. 12(5)).

As described above, according to the fourth embodiment, even when a failure has occurred in the datacenter DC1 and it becomes impossible to continuously provide a communication service, the normal datacenter DC2 can continuously provide the communication service to the user site US1.

Fifth Embodiment

In the fifth embodiment, when a user site includes an appliance type IP telephone server, a datacenter on a cloud and the appliance type IP telephone server of the user site provide a communication service in cooperation with each other. In the fifth embodiment, a call control function as the most basic function uses the appliance type IP telephone server included in the user site, and additional functions as those other than the call control function (for example, a teleconference service), which have low frequencies of use, use a server in the datacenter on the cloud.

FIG. 13 is a block diagram showing the schematic arrangement of a communication system according to the fifth embodiment. In FIG. 13, the same reference numerals denote the same parts as in FIG. 1, and a detailed description thereof will not be repeated.

A user site US1 of user sites US1 to USm will be described below on behalf of the user sites. The user site US1 includes an appliance type IP telephone server (to be simply referred to as an IP telephone server hereinafter) ASV1. The IP telephone server ASV1 includes an exchange control function which establishes a session according to, for example, an Session Initiation Protocol (SIP) between IP telephone stations IPT1 to IPTm and between these IP telephone stations IPT1 to IPTm and a public network NW1 or other user sites US2 to USm. After the session is established, voice communications are made by exchanging RTP packets via a peer-to-peer connection between telephone terminals on the calling and called sides.

The operation in the above arrangement will be described below.

In order to allow the user to use the system of the fifth embodiment, the user makes a contract with a telephone service provider via a maintenance agency. As for the contents of the contract, the user makes the contract in association with use of a teleconference function and Web conference function to receive a license. Note that the user normally contracts the required number of lines depending on frequencies of use of a teleconference and Web conference.

A dealer operates a user site US1 according to the contract contents with the user to register the contracted user.

In response to the operation at the user site US1, a provisioning server CSV5 of a datacenter DC1 controls an Admin container of a virtual host server to set use permission/inhibition of the teleconference function and Web conference function. Note that the maintenance of the user site US1 is not made by the provisioning server CSV5, and is manually set by a maintenance agency MT.

Upon completion of such settings, the user can use the teleconference function or Web conference function of the datacenter DC1 on the cloud.

Figure 14:
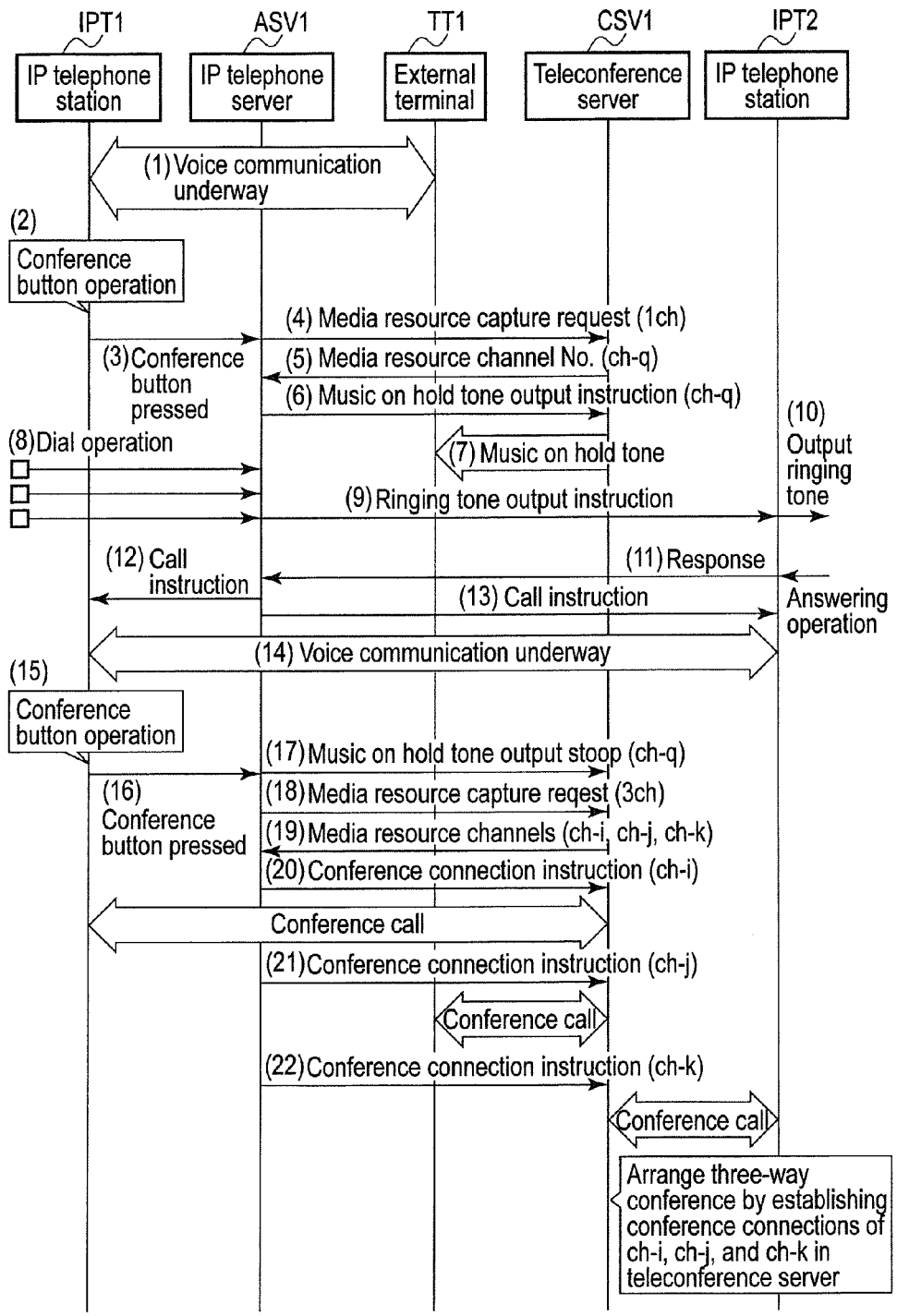
FIG. 14 is a sequence chart showing a cooperation between a datacenter and an IP telephone server at a user site according to the fifth embodiment.

FIG. 14 is a sequence chart showing a cooperation between the datacenter DC1 and the IP telephone server ASV1 of the user site US1 when the user makes an operation for adding an IP telephone station IPT2 to a conference call at the IP telephone station IPT1 during voice communications with a subscriber terminal TT1.

Assume that the user is talking with the subscriber terminal TT1 at the IP telephone station IPT1 (FIG. 14(1)). When the user of the IP telephone station IPT1 operates a conference button (FIG. 14(2)), the IP telephone server ASV1 is notified of this operation (FIG. 14(3)). The IP telephone server ASV1, which detected the conference button operation, sends a disconnection instruction of an audio stream of the IP telephone station IPT1 to the IP telephone station IPT1, and also sends a dial tone generation control signal to the IP telephone station IPT1.

Furthermore, the IP telephone server ASV1 sends a media resource capture request to a teleconference server CSV1 (FIG. 14(4)) to capture a media resource for one channel (Ch-q) from the teleconference server CSV1 (FIG. 14(5)), and sends a Music On Hold tone output instruction to the media resource channel (Ch-q) (FIG. 14(6)).

The teleconference server CSV1 issues, to the channel (Ch-q), an instruction to reproduce a Music On Hold tone and to supply a reproduced audio stream to the channel (Ch-q) of the SIP public network NW1 (FIG. 14(7)). After the above processing, the user at the subscriber terminal TT1 listens to the Music On Hold tone.

After the user of the IP telephone station IPT1 listens to the dial tone, he or she operates a dial to call out a conference member (FIG. 14(8)). The IP telephone server ASV1 is notified of this dial operation, and sends a ringing tone output instruction to a member (the IP telephone station IPT2 in this case) (FIG. 14(9)) after the conference member is specified, thereby calling out the IP telephone station IPT2 (FIG. 14(10)).

When the user of the IP telephone station IPT2 answers the call, the IP telephone station IPT2 returns a response to the IP telephone server ASV1 (FIG. 14(11)). The IP telephone server ASV1 sends a call instruction to the IP telephone station IPT1 (FIG. 14(12)), and also sends a call instruction to the IP telephone station IPT2 (FIG. 14(13)), thus forming an audio stream between the IP telephone stations IPT1 and IPT2 (FIG. 14(14)).

When the user of the IP telephone station IPT1 operates the conference button from this state (FIG. 14(15)), the IP telephone server ASV1 is notified of this operation (FIG. 14(16)). The IP telephone server ASV1 issues a Music On Hold tone stop instruction to the media resource (Ch-q) (FIG. 14(17)), and releases the media resource (Ch-q).

Next, the IP telephone server ASV1 sends a media resource capture request to the teleconference server CSV1 (FIG. 14(18)), and captures media resources (for three channels in this case) as many as the number of conference members from the teleconference server CSV1 (FIG. 14(19)). Then, the IP telephone server ASV1 instructs to form an audio stream between a media resource (Ch-i) and the IP telephone station IPT1 (FIG. 14(20)), instructs to form an audio stream between a media resource (Ch-j) and a resource (Ch-X) of the SIP public network NW1 (FIG. 14(21)), and instructs to form an audio stream between a media resource (Ch-k) and the IP telephone station IPT2 (FIG. 14(22)). Thus, the IP telephone server ASV1 arranges a three-way conference with the inclusion of the subscriber terminal TT1 of the external user.

In response to an on-hook operation of the conference member, the IP telephone server ASV1 releases the media resources (Ch-i, Ch-j, and Ch-k), and disconnects the audio streams.

Furthermore, assume that the user makes an operation for adding the IP telephone station IPT2 to a conference call using video information, data, and the like at the IP telephone station IPT1 during voice communications with the subscriber terminal TT1. The IP telephone server ASV1 is notified of this operation. The IP telephone server ASV1, which detected the conference button operation, sends a disconnection instruction of an audio stream of the IP telephone station IPT1 to the IP telephone station IPT1, and also sends a dial tone generation control signal to the IP telephone station IPT1.

Moreover, the IP telephone server ASV1 sends a media resource capture request to a Web conference server CSV2 to capture a media resource for one channel (Ch-q) from the Web conference server CSV2, and sends a Music On Hold tone output instruction to the media resource channel (Ch-q).

The Web conference server CSV2 issues, to the channel (Ch-q), an instruction to reproduce a Music On Hold tone and to supply a reproduced audio stream to the channel (Ch-q) of the SIP public network NW1. Thus, the user of the subscriber terminal TT1 listens to the Music On Hold tone.

After the user of the IP telephone station IPT1 listens to the dial tone, he or she operates a dial to call out a conference member. The IP telephone server ASV1 is notified of this dial operation, and sends a ringing tone output instruction to a member (the IP telephone station IPT2 in this case) after the conference member is specified, thereby calling out the IP telephone station IPT2.

When the user of the IP telephone station IPT2 answers the call, the IP telephone station IPT2 returns a response to the IP telephone server ASV1. The IP telephone server ASV1 sends a call instruction to the IP telephone station IPT1, and also sends a call instruction to the IP telephone station IPT2, thus forming an audio stream between the IP telephone stations IPT1 and IPT2.

When the user of the IP telephone station IPT1 operates the conference button from this state, the IP telephone server ASV1 is notified of this operation. The IP telephone server ASV1 instructs the media resource (Ch-q) to stop the Music On Hold tone, and releases the media resource (Ch-q).

Next, the IP telephone server ASV1 sends a media resource capture request to the Web conference server CSV2, and captures media resources (for three channels in this case) as many as the number of conference members from the Web conference server CSV2. Then, the IP telephone server ASV1 instructs to form an audio stream between a media resource (Ch-i) and the IP telephone station IPT1, instructs to form an audio stream between a media resource (Ch-j) and a resource (Ch-X) of the SIP public network NW1, and instructs to form an audio stream between a media resource (Ch-k) and the IP telephone station IPT2. Thus, the IP telephone server ASV1 arranges a three-way conference with the inclusion of the subscriber terminal TT1 of the external user.

As described above, according to the fifth embodiment, when the call control function is used at the user site US1, the IP telephone server ASV1 equipped at the user site US1 is used. When the teleconference function or Web conference function is used, that of the datacenter DC1 on the cloud is used. Hence, communication services can be executed by sharing the IP telephone server ASV1 of the user site US1 without any resort to the datacenter DC1 on the cloud. Thus, functions (for example, a conference application and Web application) which use server resources such as a CPU and memory can be added without changing hardware resources of the user. For example, in case of initial investment, expensive hardware resources need not be prepared in prospect of future function additions.

In the fifth embodiment, when the call control function is used at the user site US1, the CP container of the datacenter DC1 on the cloud can be used. When the teleconference function or Web conference function is used, that of the IP telephone server ASV1 of the user site US1 can also be used.

Sixth Embodiment

In the sixth embodiment, when a failure has occurred in an IP telephone server, a connection is established again to a datacenter DC1 on a cloud to continue a communication service. In this case, the user makes a contract with a telephone service provider in advance via the maintenance agency.

FIG. 15 is a sequence chart showing a communication switching operation among an IP telephone station IPT1, IP telephone server ASV1, and CP container when a failure has occurred in the IP telephone server ASV1 of a user site US1.

In this case, when the user of the IP telephone station IPT1 wants to receive a standby service, an operational support server CSV3 generates a standby CP container (CP1), and downloads operation data to the CP container CP1 (FIG. 15(01)).

Now assume that the IP telephone station IPT1 as an extension terminal and a subscriber terminal TT1 on an SIP public network NW1 talk with each other via the IP telephone server ASV1 (FIG. 15(1)). In this state, the IP telephone station IPT1 monitors a failure of the IP telephone server ASV1. As the failure monitoring method, a method of monitoring whether or not a periodic signal from the IP telephone server ASV1 can be received is used.

Assume that a failure has occurred in the IP telephone server ASV1 in this state, and occurrence of the failure is detected by the IP telephone station IPT1 (FIG. 15(2)). Then, the IP telephone station IPT1 sends a connection request signal to the CP container (CP1) of the datacenter DC1 so as to transfer communications to the CP container (CP1) of a virtual host server N1 of the datacenter DC1 on the cloud (FIG. 15(3)).

Upon reception of the connection request signal from the IP telephone station IPT1, the CP container (CP1) starts processing for taking over communications between the IP telephone station IPT1 and the subscriber terminal TT1 on an SIP public network NW1. Then, the CP container (CP1) sends a connection acceptance signal to the IP telephone station IPT1 (FIG. 15(4)). At this time, in this connection acceptance signal, information indicating that takeover processing of the communications has succeeded, for example, "normal" is inserted as a release reason. The IP telephone station IPT1 can recognize based on this information that the communications can be normally taken over.

In this way, the IP telephone server ASV1 of the user site US1 is switched to the CP container (CP1), and the IP telephone station IPT1 and the subscriber terminal TT1 on the SIP public network NW1 can continuously talk with each other via the CP container (CP1) (FIG. 15(5)).

As described above, according to the sixth embodiment, even when a failure has occurred in the IP telephone server ASV1 of the user site US1, and it becomes impossible to continue a communication service, the CP container (CP1) of the datacenter DC1 on the cloud can continuously provide the communication service to the user site US1.

Seventh Embodiment

In the seventh embodiment, when a traffic of an IP telephone server exceeds a threshold, a CP container of a datacenter DC1 on a cloud is used. In this case, the user makes a contract with a telephone service provider via a maintenance agency. As for the contents of the contract, the user makes the contract in association with the required number of extension terminals, the number of lines, and use of additional functions (a teleconference function, Web conference function, etc.) to receive a license.

(Registration Change from IP Telephone Server to CP Container Depending on Traffic)

FIG. 16 is a sequence chart showing operations for executing a registration destination change processing among an IP telephone station IPT1, an IP telephone server ASV1, and the datacenter DC1.

Now assume that the IP telephone station IPT1 is registered in the IP telephone server ASV1. In this state, the IP telephone server ASV1 monitors whether or not a traffic exceeds a threshold 1 (FIG. 16(1)). When the traffic exceeds the threshold 1, a high-priority user continues to operate an IP telephone station of a service class, which is set with data in advance, intact, and a low-priority user (for example, the IP telephone station IPT1) notifies a re-registration request to the datacenter DC1 on the cloud (FIG. 16(2)).

When the IP telephone station IPT1 is registered in response to the notification of the re-registration request from the IP telephone server ASV1, the user of the IP telephone station IPT1 makes an outgoing call operation that designates the datacenter DC1 (FIG. 16(3)). Then, the IP telephone station IPT1 generates a registration request addressed to the datacenter DC1, and sends this request to the IP telephone server ASV1 (FIG. 16(4)).

Upon reception of the registration request, the IP telephone server ASV1 notifies the datacenter DC1 of a registration request including an IP address of the IP telephone station IPT1 (FIG. 16(5)).

When an operational support server CSV3 of the datacenter DC1 responds to this registration request notification (FIG. 16(6)), a CP container (CP1) is generated in a virtual host server N1 in the datacenter DC1, and a session is established between the virtual host server N1 and IP telephone station IPT1, thus registering the IP address of the IP telephone station IPT1 in the CP container (CP1) of the virtual host server N1 (FIG. 16(7)).

When the traffic is less than a threshold 2 which assumes a value smaller than the threshold 1, the IP telephone server ASV1 notifies the registered IP telephone station IPT1 of a re-registration request.

When the IP telephone station IPT1 is registered in response to the re-registration request notification from the IP telephone server ASV1, the user of the IP telephone station IPT1 makes an outgoing call operation designated with the datacenter DC1. Then, the IP telephone station IPT1 generates a registration request addressed to the datacenter DC1, and sends this request to the IP telephone server ASV1.

Then, upon reception of the registration request, the IP telephone server ASV1 notifies the datacenter DC1 of a registration request including the IP address of the IP telephone station IPT1.

When the operational support server CSV3 of the datacenter DC1 responds to this registration request notification, the CP container (CP1) is generated in the virtual host server N1, and a session is established between the virtual host server N1 and IP telephone station IPT1, thus registering the IP address of the IP telephone station IPT1 in the CP container (CP1) of the virtual host server N1.

As described above, according to the seventh embodiment, when the traffic of the IP telephone server ASV1 of the user site US1 is increased, the communication service to be provided to the user site US1 is taken over to the CP container (CP1) of the datacenter DC1, thus reducing the processing load on the IP telephone server ASV1. On the other hand, when the use amount by the IP telephone server ASV1 is small, the user site US1 is registered in, for example, the CP container (CP1) of the datacenter DC1, thus reducing power consumption of the user site US1 as a whole. Furthermore, for the datacenter DC1 side, the number of CP containers can be automatically increased according to the traffic of the IP telephone server ASV1, thus enhancing the convenience.

Eighth Embodiment

In the eighth embodiment, when a traffic of an IP telephone server of a user site becomes equal to or smaller than a threshold, an IP telephone station IPT1 is re-registered from a datacenter on a cloud to the IP telephone server of the user site. In this case, the user makes a contract with a telephone service provider in advance via a maintenance agency.

(Registration Change from Datacenter on Cloud to IP Telephone Server Depending on Traffic)

FIG. 17 is a sequence chart showing operations for executing registration destination change processing among an IP telephone station IPT1, datacenter DC1, and IP telephone server ASV1.

Now assume that the IP telephone station IPT1 is registered in a CP container (CP1) of a virtual host server N1 of the datacenter DC1. In this state, the IP telephone server ASV1 monitors whether or not a self traffic becomes equal to or smaller than a threshold (FIG. 17(1)). When the traffic becomes equal to or smaller than the threshold, the IP telephone server ASV1 notifies the registered IP telephone station IPT1 of a re-registration request (FIG. 17(2)).

When the IP telephone station IPT1 is registered in response to the re-registration request notification from the IP telephone server ASV1, the user of the IP telephone station IPT1 makes an outgoing call operation to the IP telephone server ASV1 (FIG. 17(3)). Then, the IP telephone station IPT1 generates a registration request addressed to the IP telephone server ASV1, and sends this request to the IP telephone server ASV1 (FIG. 17(4)). The IP telephone server ASV1 sends a registration request to the datacenter DC1 (FIG. 17(5)).

Upon reception of the registration request, the datacenter DC1 notifies the IP telephone server ASV1 of a response including an IP address of the IP telephone station IPT1 (FIG. 17(6)).

Upon reception of this response, the IP telephone server ASV1 establishes a session with the IP telephone station IPT1, and registers the IP address of the IP telephone station IPT1 (FIG. 17(7)).

As described above, according to the eighth embodiment, when the traffic of the IP telephone server of the user site US1 becomes equal to or smaller than the threshold, the IP telephone station IPT1 registered in the CP container (CP1) of the datacenter DC1 is re-registered to the IP telephone server ASV1 of the user site US1, thus reducing the processing load on the virtual host server N1. When the use amount by the user site US1 registered in the virtual host server N1 is small, the IP telephone station IPT1 is re-registered to, for example, the IP telephone server ASV1 of the user site US1, thus generating the virtual host server N1, the operation of which is not required, thereby reducing the power consumption of the datacenter DC1 as a whole.

Other Embodiments

As another embodiment, the datacenter DC1 can continue to provide a communication service to the user site US1 by transferring and setting exchange software to, for example, an IP telephone server allocated in the user site US1.

In this manner, when the user site US1 includes the IP telephone server, for example, even when a failure has occurred in the datacenter DC1 and it becomes difficult to provide a communication service, exchange software corresponding to the communication function contracted by the user site US1 can be set in self IP telephone server via the Internet INW. As a result, the communication service can be continuously provided to the user site US1. Note that a traffic, date and time, and the like may be used as conditions to be judged.

Furthermore, the aforementioned embodiments have exemplified the case in which the plurality of virtual host servers N1 to Np are equipped. However, only one virtual host server N1 may be equipped. In this case, even when a failure has occurred in the virtual host server N1, a CP container can be assigned to the remaining servers.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
at least one user apparatus as a communication terminal; and
a datacenter apparatus configured to be connected to the user apparatus via a communication network, and provide an arbitrary communication service to the user apparatus, wherein the arbitrary communication service is associated with exchange processing between communication terminals or between a communication terminal and a communication line,
the datacenter apparatus comprising:
one or more servers in which a plurality of CP containers are generated for providing a communication service by executing a plurality of communication functions associated with the exchange processing between the communication terminals or between the communication terminal and the communication line, and one or more ADMIN containers are generated for operation and maintenance of at least any one of the plurality of CP containers by respective maintenance agencies;
a memory configured to store a user ID used to identify the user apparatus to be associated with at least one of the plurality of CP containers; and
a controller configured to provide the communication service when a use request of the communication function is received from the user apparatus, the communication service provided using at least one of the plurality of CP containers associated with the user ID of the user apparatus of request origin, and to operate and manage at least any one of the CP containers using the ADMIN containers in response to a request from the maintenance agencies.

2. The system of claim 1, wherein the one or more servers are a first server configured to generate a first CP container and a second server configured to generate a second CP container, and
the controller moves the first CP container generated in the first server to the second server from the first server, when a traffic processed by the first CP container generated in the first server is increased.

3. The system of claim 1, wherein the one or more servers are a first server configured to generate a first CP container and a second server configured to generate a second CP container,
the user apparatus includes a first user apparatus and a second user apparatus, and
the controller integrates a first CP container generated in the first server and a second CP container generated in the second server to one of the first server and the second server, when traffics of the first user apparatus and the second user apparatus are decreased.

4. The system of claim 1, wherein the one or more servers are a first server configured to generate a first CP container and a second server configured to generate a second CP container,
the user apparatus includes a first user apparatus to which the first CP container is associated and a second user apparatus to which the second CP container is associated, and
the controller controls the second CP container or a CP container different from the first CP container and the second CP container to continue to provide a communication service to the first user apparatus, when a failure has occurred in the first CP container corresponding to the first user apparatus.

5. The system of claim 1, wherein, when there are a plurality of user apparatuses, the controller generates at least some of the plurality of CP containers in the server, and controls a plurality of user apparatuses to share and use the generated CP containers.

6. The system of claim 1, wherein, when there are a plurality of user apparatus and the number of the maintenance agencies is increased, the controller generates ADMIN containers corresponding increased maintenance agencies in the server, and parallelly provides a communication service to a plurality of user apparatuses.

7. The system of claim 6, wherein the controller deletes ADMIN containers corresponding to decreased maintenance agencies from the server, when the number of the maintenance agencies is decreased.

8. The system of claim 1, wherein the controller controls another datacenter apparatus to continue to provide a communication service to the user apparatus, when a failure has occurred in a CP container corresponding to the first user apparatus.

9. The system of claim 1, wherein the controller sends application software information as at least a part of software information required to execute the communication service to a server of the user apparatus to run in cooperation therewith, when the user apparatus has a call control function, and a server arranged in the datacenter apparatus and the server arranged in the user apparatus coexist.

10. The system of claim 9, wherein the controller controls, in the cooperation between the server of the user apparatus and the server of the datacenter apparatus, the server of the user apparatus to execute a communication function associated with the exchange processing between the communication terminals or between the communication terminal and the communication line, and controls the server of the datacenter apparatus to execute an additional function.

11. The system of claim 9, wherein the controller controls, in the cooperation between the server of the user apparatus and the server of the datacenter apparatus, the server of the user apparatus to provide a communication service in a normal state, and controls the server of the datacenter apparatus to provide the communication service when a failure has occurred.

12. The system of claim 9, wherein the controller uses, in the cooperation between the server of the user apparatus and the server of the datacenter apparatus, a CP container of the server of the datacenter apparatus in correspondence with an exceeded value, when a traffic of the user apparatus exceeds a threshold.

13. The system of claim 9, wherein the controller provides, in the cooperation between the server of the user apparatus and the server of the datacenter apparatus, the communication service by re-registering the server of the user apparatus, when a traffic of the user apparatus becomes less than or equal to a threshold.

14. A datacenter apparatus being connected to at least one user apparatus as a communication terminal via a communication network, and providing an arbitrary communication service to the user apparatus, wherein the arbitrary communication service is associated with exchange processing between communication terminals or between a communication terminal and a communication line, the apparatus comprising:
one or more servers of the datacenter apparatus in which a plurality of CP containers are generated for providing a communication service by executing a plurality of communication functions associated with the exchange processing between the communication terminals or between the communication terminal and the communication line, and one or more ADMIN containers are generated for operation and maintenance of at least any one of the plurality of CP containers by respective maintenance agencies;
a memory configured to store a user ID used to identify the user apparatus to be associated with at least one of the plurality of CP containers; and
a controller configured to provide the communication service when a use request of the communication function is received from the user apparatus, the communication service provided using at least one of the plurality of CP containers associated with the user ID of the user apparatus of request origin, and to operate and manage at least any one of the CP containers using the ADMIN containers in response to a request from the maintenance agencies.

15. The apparatus of claim 14, wherein the one or more servers are a first server configured to generate a first CP container and a second server configured to generate a second CP container, and
the controller moves the first CP container generated in the first server to the second server from the first server, when a traffic processed by the first CP container generated in the first server is increased.

16. The apparatus of claim 14, wherein the one or more servers are a first server configured to generate a first CP container and a second server configured to generate a second CP container,
the user apparatus includes a first user apparatus and a second user apparatus, and
the controller integrates a first CP container generated in the first server and a second CP container generated in the second server to one of the first server and the second server, when traffics of the first user apparatus and the second user apparatus are decreased.

17. The apparatus of claim 14, wherein the one or more servers are a first server configured to generate a first CP container and a second server configured to generate a second CP container,
the user apparatus includes a first user apparatus to which the first CP container is associated and a second user apparatus to which the second CP container is associated, and
the controller controls the second CP container or a CP container different from the first CP container and the second CP container to continue to provide a communication service to the first user apparatus, when a failure has occurred in the first CP container corresponding to the first user apparatus.

18. The apparatus of claim 14, wherein, when there are a plurality of user apparatuses, the controller generates at least some of the plurality of CP containers in the server, and controls a plurality of user apparatuses to share and use the generated CP containers.

19. The apparatus of claim 14, wherein, when there are a plurality of user apparatuses and the number of the maintenance agencies is increased, the controller generates ADMIN containers corresponding increased maintenance agencies in the server, and parallelly provides a communication service to a plurality of user apparatuses.

20. The apparatus of claim 19, wherein the controller deletes ADMIN containers corresponding to decreased maintenance agencies from the server, when the number of the maintenance agencies is decreased.

21. The apparatus of claim 14, wherein the controller controls another datacenter apparatus to continue to provide a communication service to the user apparatus, when a failure has occurred in a CP container corresponding to the user apparatus.

22. The apparatus of claim 14, wherein the controller sends application software information as at least a part of software information required to execute the communication service to a server of the user apparatus to run in cooperation therewith, when the user apparatus has a call control function, and a server arranged in the datacenter apparatus and the server arranged in the user apparatus coexist.

23. The apparatus of claim 22, wherein the controller controls, in the cooperation between the server of the user apparatus and the server of the datacenter apparatus, the server of the user apparatus to execute a communication function associated with the exchange processing between the communication terminals or between the communication terminal and the communication line, and controls the server of the datacenter apparatus to execute an additional function.

24. The apparatus of claim 22, wherein the controller controls, in the cooperation between the server of the user apparatus and the server of the datacenter apparatus, the server of the user apparatus to provide a communication service in a normal state, and controls the server of the datacenter apparatus to provide the communication service when a failure has occurred.

25. The apparatus of claim 22, wherein the controller uses, in the cooperation between the server of the user apparatus and the server of the datacenter apparatus, a CP container of the server of the datacenter apparatus in correspondence with an exceeded value, when a traffic of the user apparatus exceeds a threshold.

26. The apparatus of claim 22, wherein the controller provides, in the cooperation between the server of the user apparatus and the server of the datacenter apparatus, the communication service by re-registering the server of the user apparatus, when a traffic of the user apparatus becomes less than or equal to a threshold.

27. A control method used in a datacenter apparatus being connected to at least one user apparatus as a communication terminal via a communication network, providing an arbitrary communication service to the user apparatus, wherein the arbitrary communication service associated with exchange processing between communication terminals or between a communication terminal and a communication line, and comprising one or more servers in which a plurality of CP containers are generated for providing a communication service by executing a plurality of communication functions associated with the exchange processing between the communication terminals or between the communication terminal and the communication line and one or more ADMIN containers are generated for operation and maintenance of at least any one of the plurality of CP containers by respective maintenance agencies, the method comprising:

storing a user ID used to identify the user apparatus in a memory to be associated with at least one of the plurality of CP containers; and providing the communication service when a use request of the communication function is received from the user apparatus, the communication service provided using at least one of the plurality of CP containers associated with the user ID of the user apparatus of request origin, and performing operation and management of at least any one of the CP containers using the ADMIN containers in response to a request from the maintenance agencies.

28. The method of claim 27, wherein the one or more servers are a first server configured to generate a first CP container and a second server configured to generate a second CP container, and the providing the communication service comprises moving the first CP container generated in the first server to the second server from the first server, when a traffic processed by the first CP container generated in the first server is increased.

29. The method of claim 27, wherein the one or more servers are a first server configured to generate a first CP container and a second server configured to generate a second CP container, the user apparatus includes a first user apparatus and a second user apparatus, and the providing the communication service comprises integrating a first CP container generated in the first server and a second CP container generated in the second server to one of the first server and the second server, when traffics of the first user apparatus and the second user apparatus are decreased.

30. The method of claim 27, wherein the one or more servers are a first server configured to generate a first CP container and a second server configured to generate a second CP container, the user apparatus includes a first user apparatus to which the first CP container is associated and a second user apparatus to which the second CP container is associated, and the providing the communication service comprises controlling the second CP container or a CP container different from the first CP container and the second CP container to continue to provide a communication service to the first user apparatus, when a failure has occurred in the first CP container corresponding to the first user apparatus.

31. The method of claim 27, wherein, when there are a plurality of user apparatuses, the providing the communication service comprises generating at least some of the plurality of CP containers in the server, and controlling a plurality of user apparatuses to share and use the generated CP containers.

32. The method of claim 27, wherein, when there are a plurality of user apparatuses and the number of the maintenance agencies is increased, the providing the communication service comprises generating ADMIN containers corresponding increased maintenance agencies in the server, and parallelly providing a communication service to a plurality of user apparatuses.

33. The method of claim 27, wherein the providing the communication service comprises deleting ADMIN containers corresponding to decreased maintenance agencies from the server, when the number of the maintenance agencies is decreased.

34. The method of claim 27, wherein the providing the communication service comprises controlling another datacenter apparatus to continue to provide a communication service to the user apparatus, when a failure has occurred in a CP container corresponding to the first user apparatus.

35. The method of claim 27, wherein the providing the communication service comprises sending application software information as at least a part of software information required to execute the communication service to a server of the user apparatus to run in cooperation therewith, when the user apparatus has a call control function, and a server arranged in the datacenter apparatus and the server arranged in the user apparatus coexist.

36. The method of claim 35, wherein the providing the communication service comprises controlling, in the cooperation between the server of the user apparatus and the server of the datacenter apparatus, the server of the user apparatus to execute a communication function associated with the exchange processing between the communication terminals or between the communication terminal and the communication line, and controls the server of the datacenter apparatus to execute an additional function.

37. The method of claim 35, wherein the providing the communication service comprises controlling, in the cooperation between the server of the user apparatus and the server of the datacenter apparatus, the server of the user apparatus to provide a communication service in a normal state, and controls the server of the datacenter apparatus to provide the communication service when a failure has occurred.

38. The method of claim 35, wherein the providing the communication service comprises using, in the cooperation between the server of the user apparatus and the server of the datacenter apparatus, a CP container of the server of the datacenter apparatus in correspondence with an exceeded value, when a traffic of the user apparatus exceeds a threshold.

39. The method of claim 35, wherein the providing the communication service comprises providing, in the cooperation between the server of the user apparatus and the server of the datacenter apparatus, the communication service by re-registering the server of the user apparatus, when a traffic of the user apparatus becomes less than or equal to a threshold.

* * * * *